United States Patent
Jones

(10) Patent No.: US 11,128,394 B2
(45) Date of Patent: Sep. 21, 2021

(54) SYSTEMS AND METHODS FOR OPTICAL PROTECTION SWITCH WITH SINGLE-ENDED ACTIVATION, OPERATION, AND PROVISION OF 1+1 PROTECTION OVER REDUNDANT BIDIRECTIONAL COMMUNICATIONS PATHS

(71) Applicant: Juniper Networks, Inc., Sunnyvale, CA (US)

(72) Inventor: Kevan Peter Jones, Kanata (CA)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

(21) Appl. No.: 16/420,784

(22) Filed: May 23, 2019

(65) Prior Publication Data

US 2020/0374025 A1 Nov. 26, 2020

(51) Int. Cl.
*H04J 14/02* (2006.01)
*H04Q 11/00* (2006.01)

(52) U.S. Cl.
CPC ........ *H04J 14/029* (2013.01); *H04J 14/0204* (2013.01); *H04J 14/0212* (2013.01); *H04J 14/0216* (2013.01); *H04Q 11/0062* (2013.01); *H04J 14/02* (2013.01); *H04Q 2011/0094* (2013.01)

(58) Field of Classification Search
CPC .. H04J 14/029; H04J 14/0216; H04J 14/0204; H04J 14/0212; H04J 14/02; H04Q 11/0062; H04Q 2011/0094; H04Q 2011/0043; H04Q 11/0005; H04Q 11/0067; H04Q 2011/0007; H04Q 2011/0037; H04Q 2011/0081; H04Q 2011/0083; H04B 10/032; H04B 10/038; H04B 10/0795; H04B 10/272
USPC ........................................... 398/1-8, 43–103
See application file for complete search history.

(56) References Cited

U.S. PATENT DOCUMENTS

| 5,510,917 A | * | 4/1996 | Corke | H04B 10/077 398/34 |
| 5,559,622 A | * | 9/1996 | Huber | H04B 10/032 370/228 |
| 6,057,948 A | * | 5/2000 | Mizrahi | H04J 14/0291 398/14 |

(Continued)

FOREIGN PATENT DOCUMENTS

EP 0851704 A2 7/1998

OTHER PUBLICATIONS

Smith, What is 1 plus 1 Protection Switching (APS), Oct. 2017, Sierra Hardware Design LP, All Document. https://web.archive.org/web/20171120181725/http://sierrahardwaredesign.com:80/optical-networking/11-protection-switching-aps/ (Year: 2017).*

(Continued)

*Primary Examiner* — Dibson J Sanchez
(74) *Attorney, Agent, or Firm* — Cooley LLP

(57) ABSTRACT

An apparatus includes a tail-end optical switch configured to be coupled to a broadcast star network that couples the tail-end optical switch to a head-end optical switch by a primary bidirectional optical path and a second bidirectional optical path. The tail-end optical switch having a first optical switch and a second optical switch configured to provide active switching.

18 Claims, 22 Drawing Sheets

(56) References Cited

U.S. PATENT DOCUMENTS

| | | | | |
|---|---|---|---|---|
| 6,898,376 | B1* | 5/2005 | Gerstel | H04B 10/032 398/2 |
| 7,024,110 | B2* | 4/2006 | Jasti | H04B 10/032 398/19 |
| 7,171,081 | B1* | 1/2007 | Ko | G02B 6/29361 385/31 |
| 7,174,096 | B2* | 2/2007 | Berthold | H04J 14/0297 398/5 |
| 7,343,093 | B2* | 3/2008 | Oberg | H04B 10/032 398/3 |
| 7,561,799 | B2* | 7/2009 | Togawa | G02B 6/3562 385/16 |
| 9,806,808 | B2* | 10/2017 | Bhatnagar | G01J 3/50 |
| 10,063,313 | B1* | 8/2018 | Al Sayeed | H04Q 11/0062 |
| 10,476,587 | B2* | 11/2019 | Xie | H04J 14/029 |
| 2003/0016654 | A1* | 1/2003 | Das | H04J 14/0284 370/351 |
| 2004/0057724 | A1* | 3/2004 | Oksanen | H04J 14/0227 398/5 |
| 2004/0076431 | A1* | 4/2004 | Mueller | H04B 10/032 398/33 |
| 2005/0201749 | A1* | 9/2005 | Wang | H04B 10/032 398/12 |
| 2006/0104638 | A1* | 5/2006 | Chung | H04J 14/0226 398/71 |
| 2009/0060504 | A1* | 3/2009 | Chang | H04J 14/0284 398/48 |
| 2009/0103915 | A1* | 4/2009 | Aprile | H04J 14/029 398/2 |
| 2009/0169200 | A1* | 7/2009 | Li | H04J 14/0282 398/7 |
| 2010/0119223 | A1* | 5/2010 | Ferrari | H04B 10/032 398/4 |
| 2014/0226966 | A1* | 8/2014 | Lutgen | H04J 14/0283 398/5 |

OTHER PUBLICATIONS

Cable Television Laboratories, Inc., Point-to-Point Coherent Optics, P2P Coherent Optics Architecture Specification, P2PCO-SP-ARCH-I02-190311, Mar. 11, 2019, 36 pages.

Urata, R. et al., "High Performance, Low Cost, Colorless ONU for WDM-PON," Presented at OFC/NFOEC, Mar. 2012, 3 pages.

Kjeldsen, P. et al., "Choose the Right Topology for Your Fiber-to-the-Home Network," Gartner, Inc., [Online], Retrieved from the Internet: <URL: https://www.bus.umich.edu/kresgepublic/journals/gartner/research/118400/118478/118478.html#h2>, Nov. 2003, 6 pages.

Extended European Search Report for European Application No. 19183137.9, dated Feb. 4, 2020, 10 pages.

* cited by examiner

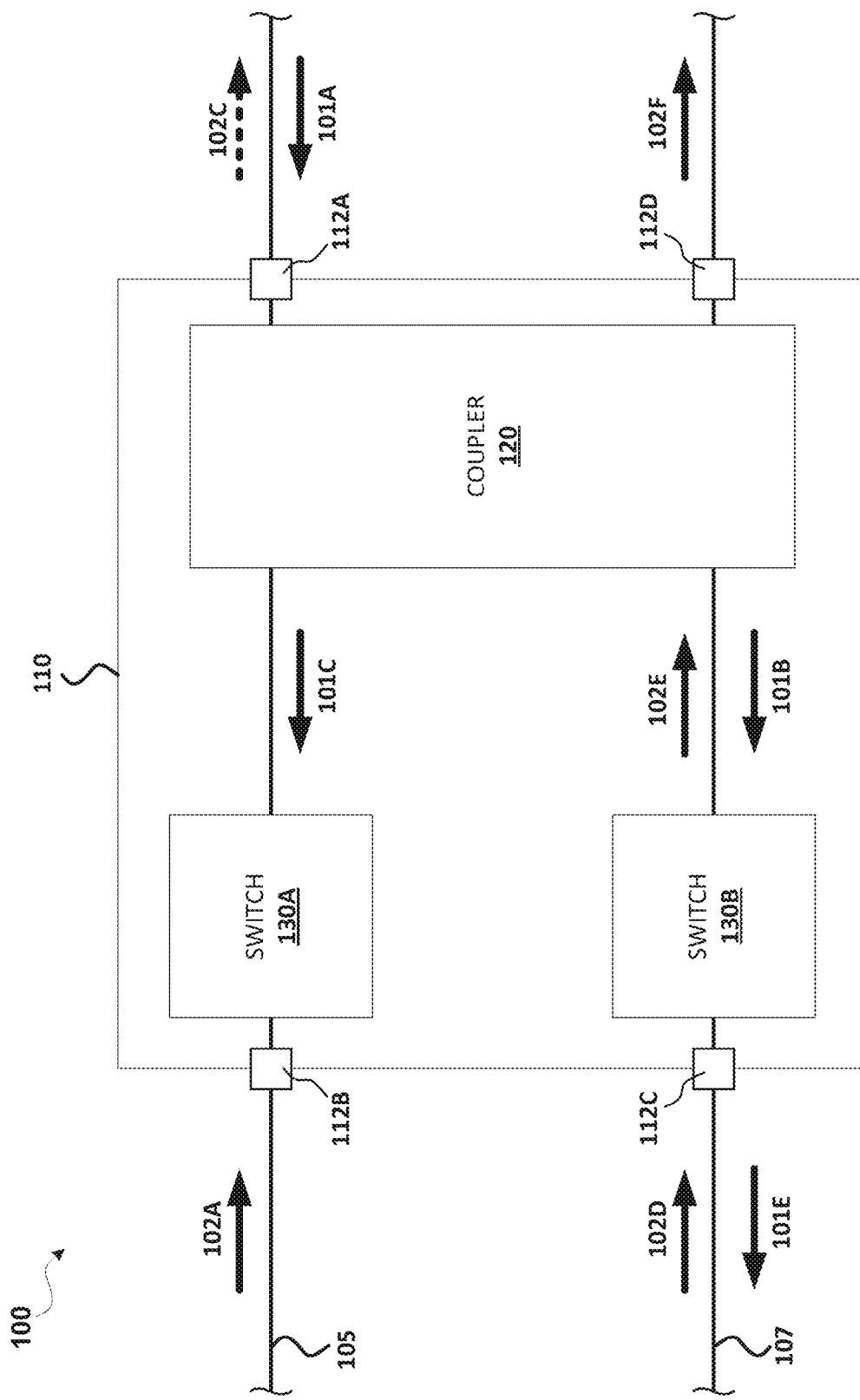

SYSTEMS AND METHODS FOR OPTICAL
PROTECTION SWITCH WITH
SINGLE-ENDED ACTIVATION, OPERATION,
AND PROVISION OF 1+1 PROTECTION
OVER REDUNDANT BIDIRECTIONAL
COMMUNICATIONS PATHS

FIELD

The present disclosure relates generally to the field of optical path protection in optical telecommunications networks, and in particular, to an optical protection switch (OPS) configured to implement active switching to provide 1+1 protection over primary and secondary bidirectional optical paths via the active switching.

BACKGROUND

Telecommunication networks usually use one or more end-to-end protection schemes to protect against potential failures on service providers' networks that might affect the services offered to end customers. In an optical telecommunication network, one protection scheme is the 1+1 protection scheme, in which a head-end optical splitter is used to split an optical signal and send duplicated copies of the optical signal into two channels, paths, or links (e.g., primary path and secondary path) for diverse path routing. The known 1+1 protection scheme also employs a tail-end optical switch (e.g., a 2×1 optical switch) connected to the two paths to select the copy of the optical signal from either the primary path or the secondary path. For example, if the optical network detects that the signal from the primary path is unsatisfactory (e.g., the signal power is lower than a threshold value), the secondary path is then used for communication.

When a bidirectional optical protection switch is applied to a bi-directional path, it is usually applied external to the directional multiplexing. This maintains and supports the "switch at both ends" type of logic used in and with known optical protection switches (e.g., unidirectional optical protection switches), which can be activated via switching operations (e.g., double-ended path protection operations) performed at both ends of a link. While this is an effective solution, it requires that (1) directional multiplexing be separated from any wave-division multiplexed (WDM) multiplexing used in multi-channel or multiple-path operations in the optical network, and (2) that optical protection switches be placed in between (e.g., endpoints).

SUMMARY

In an embodiment, the apparatus includes an optical protection switch (OPS) configured to receive a first signal having a first direction and transmit a second signal having a second direction opposite the first direction on at least one of a first optical path and a second optical path. The OPS includes a first port. The OPS further includes an optical coupler, in optical communication with the first port and configured to split, without wavelength filtering, the first signal into a first signal instance and a second signal instance, the optical coupler configured to forward, without wavelength filtering, the second signal. The OPS further includes a first switch in optical communication with the optical coupler and switchable between a first state and a second state, the first switch configured to pass the first signal instance at the first state, and block the first signal instance at the second state. The OPS further includes a second switch in optical communication with the optical coupler and switchable between the first state and the second state, the second switch configured to pass the first signal instance at the first state, and block the first signal instance at the second state. The OPS further includes a second port, in optical communication with the first switch, to pass, on the first optical path, the first signal instance. The OPS further includes a third port, in optical communication with the second switch, to transmit, on the second optical path, the second signal instance.

BRIEF DESCRIPTION OF THE DRAWINGS

FIGS. 1A-D are functional block diagrams depicting a switch apparatus, in accordance with an embodiment.

DETAILED DESCRIPTION

To meet the growing demand for high rates of data transfer or bandwidth and capacity in access networks, optical networks such as passive optical networks (PON(s)), including, for example, wave-division multiplexed-PONs (WDM PON(s)), and the like, can be implemented. For example, PONs such as WDM PONs can be implemented to provide a logical or virtual point-to-point (P2P) network topology over a physical, point-to-multipoint (P2M), fiber-based network topology. This can provide for simpler, more efficient, and sustainable network capabilities that can scale with the growing demand, and further, provide, in some instances—longer reach, greater security, and higher capacity and bandwidth (per user), and the like. PONs such as WDM PONs can provide an economical, efficient, and scalable network architecture (e.g., fiber-to-the-X (FTTx) network architecture) by which the growing demand can be met, however, various technical challenges (e.g., double-ended path protection operations via known path protection switches) contributing to the cost associated with the operation, administration, and maintenance (OA&M) of such networks still exist.

For example, one challenge in known 1+1 path protection switches used to provide two fiber pair protected solutions using diverse fiber (pair) paths, is that active switching operations are used at both ends of links. In the case of a bidirectional network, active switching is also performed at both ends of links. A bidirectional element (e.g., a beam splitter) can be configured to provide directional wavelength multiplexing, and can be a wavelength interleaver, or the like.

Accordingly, a need exists for systems and methods to overcome the aforementioned shortcomings of known optical protection switches. Some embodiments described herein are directed to an optical protection switch (OPS) designed for protection of bi-directional optical paths. Such embodiments simplify the ways in which this is achieved by delivering single-ended switching operation (typical designs involve two end switching). Moreover, this delivers a solution that is highly compatible with broadcast star networks (e.g., used in WDM PON applications). Advantageously, some embodiments described herein simplify the ways in which this is achieved by enabling and delivering a solution by which a single-ended switching operation can be performed to provide path protection, whereas in known designs, two-end switching is typically used.

In some embodiments, an apparatus including an optical protection switch is configured to provide two-end (bidirectional) switching via a single-ended switching operation. The apparatus is usable in an access network such as a WDM PON, broadcast star network, and the like. Advantageously, the apparatus can be implemented to reduce OA&M costs. Moreover, the optical protection switch is configured to combine and split signals without wavelength filtering.

Figure 1A:
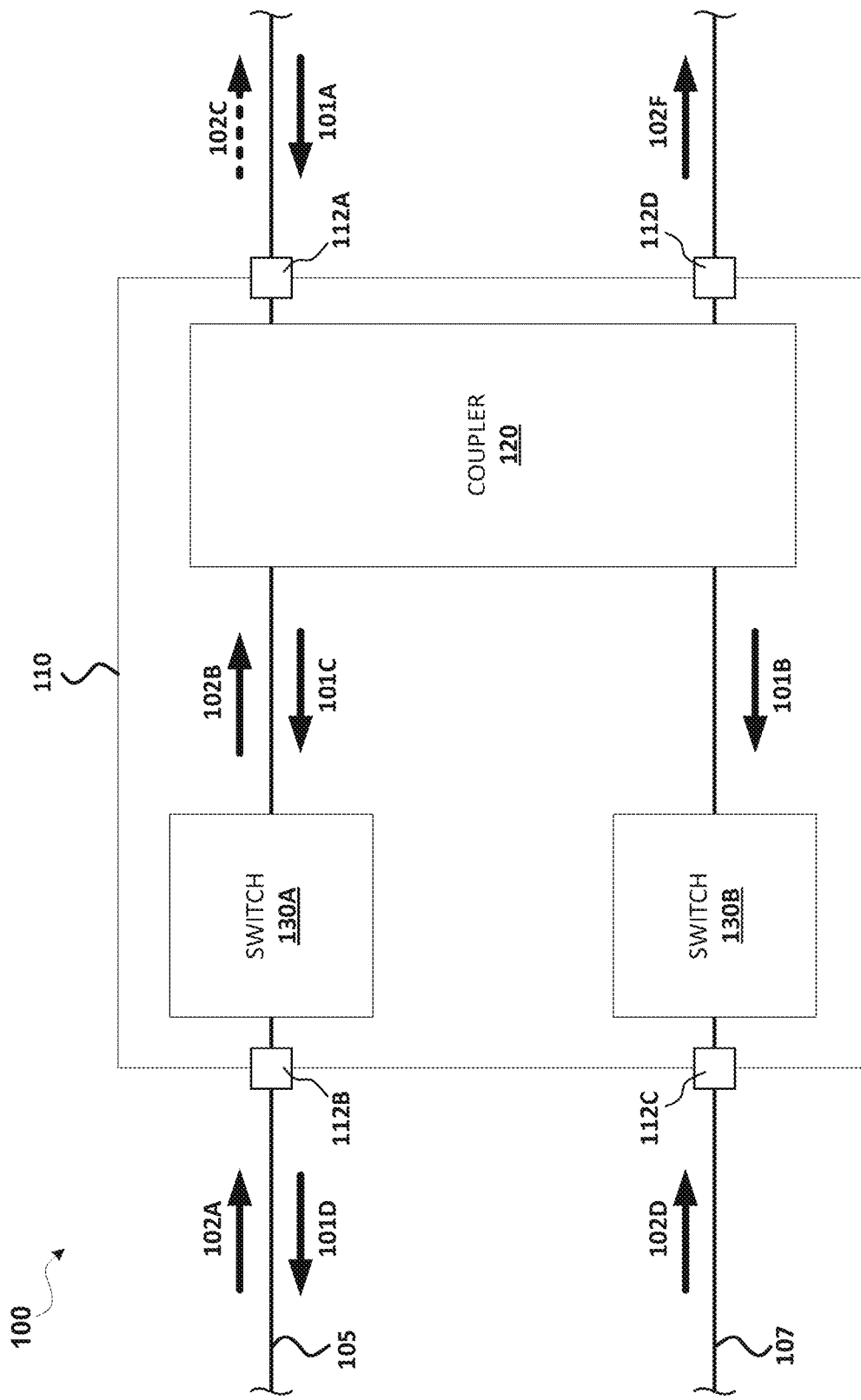
Figure 1C:
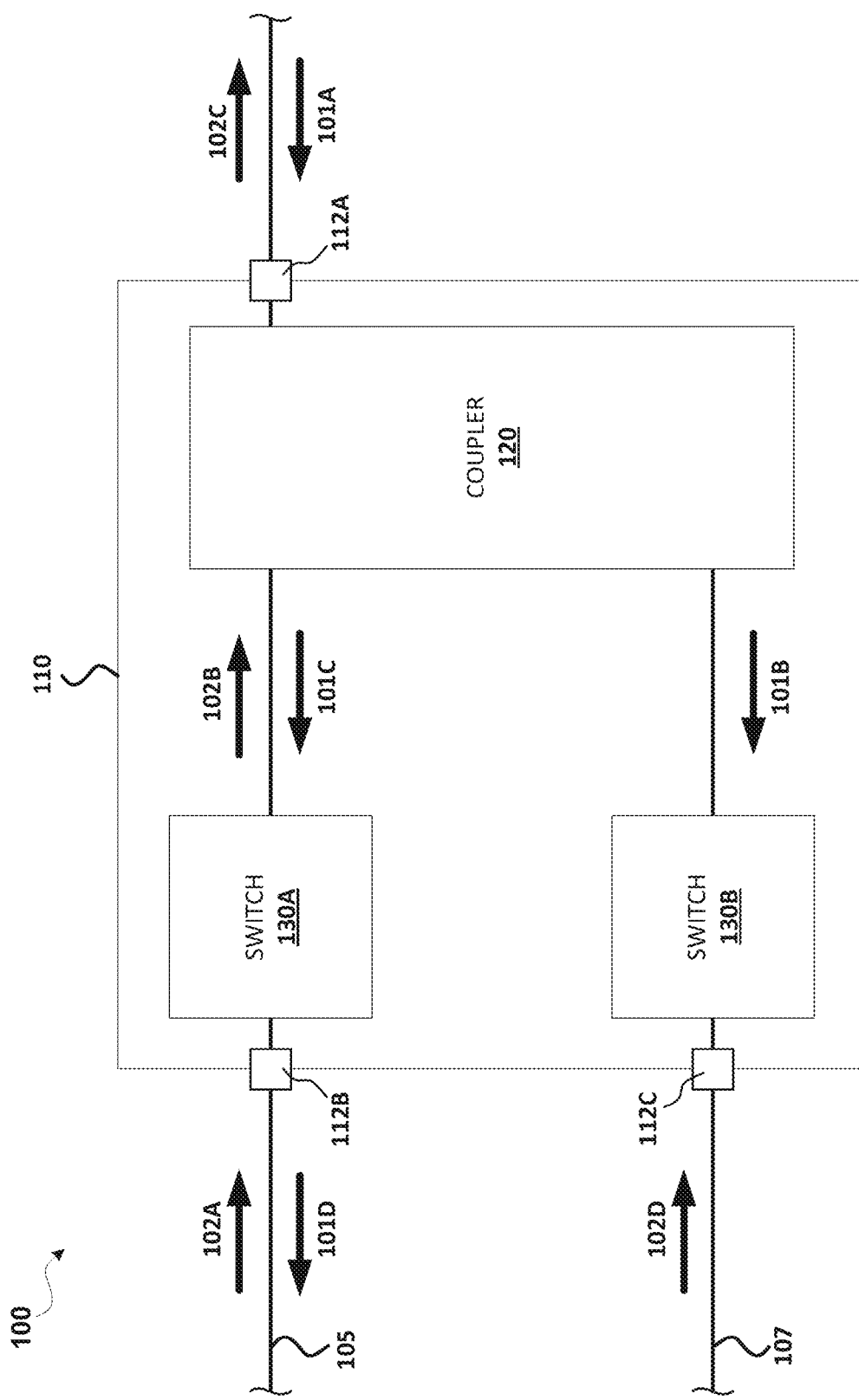
Figure 1D:
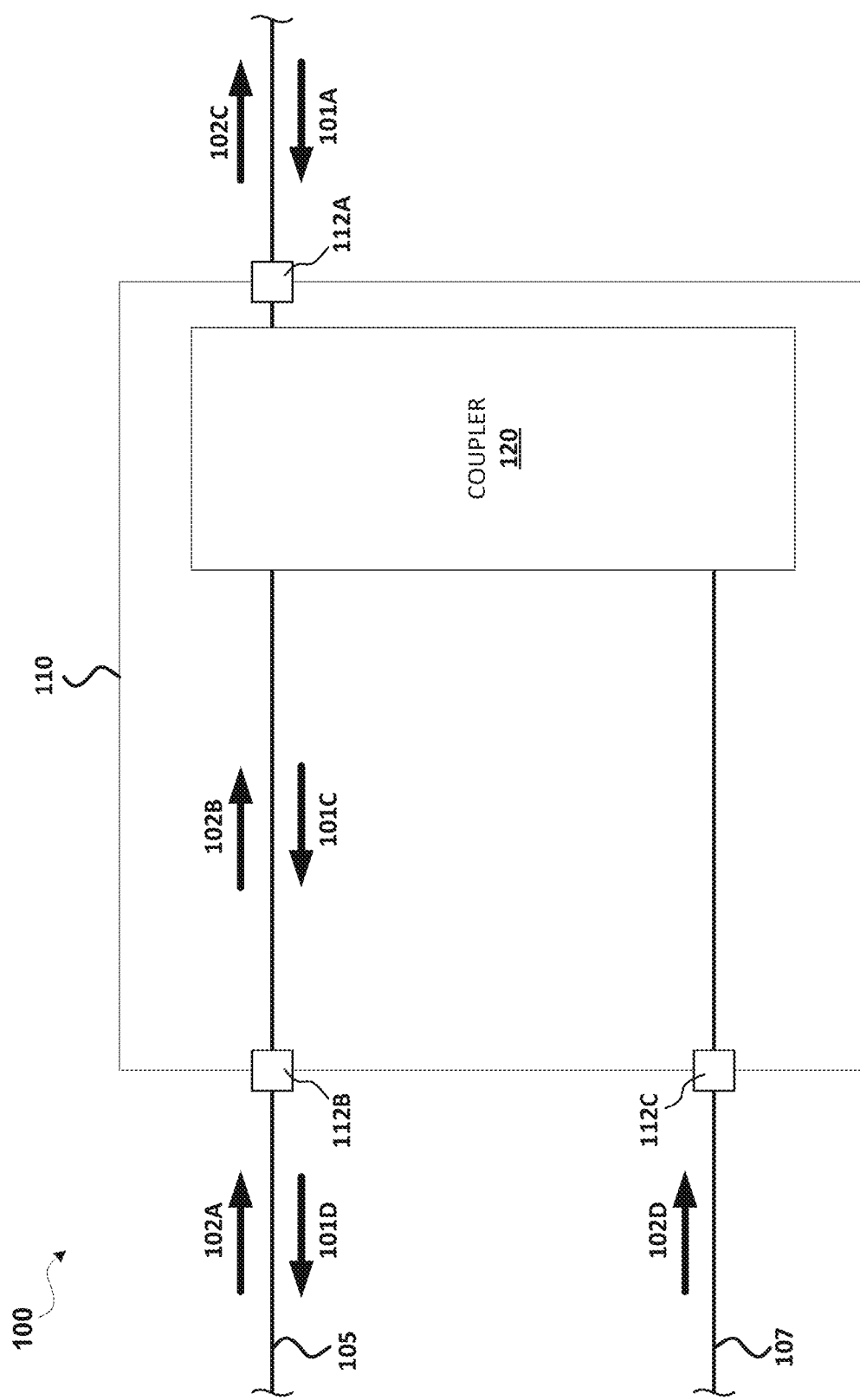

FIGS. 1A-D are functional block diagrams depicting an apparatus 100, in accordance with an embodiment. As shown, the apparatus 100 includes optical protection switch (OPS) 110. The apparatus 100 can be implemented in a network by coupling or interconnecting, over redundant communications channels, paths, links, and the like ("channel(s)" or "path(s)" or "link(s)"), the OPS 110 to an OPS of a corresponding type in the network. The communications paths can include path 105 and path 107. While the apparatus 100 and the OPS 110 are shown in FIG. 1A as including a number of discrete devices and components (e.g., 110, 112A-D, 120, 130), other arrangements are possible. For example, in some instances, the OPS 110 can include coupler 120, as well as switches 130, along with first port 112A, second port 112B, and third port 112C (collectively, "port(s) 112A-C"), such as shown in FIG. 1C. As another example, in some instances, the OPS 110 can include coupler 120, and ports 112A-C, such as shown in FIG. 1D.

The path 105 ("path 105" or "optical path 105") and the path 107 ("path 107" or "optical path 107") represent individual optical paths, links, or channels (e.g., implemented in or as part of one or more communication channels). The path 105 and/or path 107 can include, for example, one or more unidirectional paths, bidirectional paths, and the like. The path 105 and the path 107 can be configured to convey or carry network traffic, including, for example, communications signals (e.g., signals 102A-D, signals 101A-E) between nodes in a network. The communications signals can include optical signals, and split or combined instances of signals, and the like ("signal(s)" or "signal instance(s)"). For example, the path 105 and/or path 107 can respectively and individually include a common optical fiber (or multiple optical fibers) interconnected to the OPS 110, such as shown in FIG. 1.

The OPS 110 represents a path protection switch (e.g., diverse path protection switch). As shown in FIG. 1A, the OPS 110 can include coupler 120, as well as first switch 130A and second switch 130B (collectively, "switch(es) 130"). The OPS 110 can also include first port 112A, second port 112B, third port 112C, and fourth port 112D (collectively, "port(s) 112A-D"). The ports (e.g., 112A-D in FIGS. 1A-B, 112A-C in FIGS. 1C-D) represent discrete signal ports (e.g., optical signal ports). The OPS 110 can include a line-side (e.g., defined by port 112B, port 112C) at which the OPS 110 is configured to couple to paths (e.g., path 105, path 107), such as in coupling to a corresponding OPS in a network, as described herein. Further, the OPS 110 can include a transceiver-side (e.g., defined by port 112A and/or port 112D) at which the OPS 110 is configured to couple with one or more transceivers (not shown). One or more of the transceivers can include, for example, unidirectional (optical) transceivers, bidirectional (optical) transceivers, and the like.

The OPS 110 can be configured to provide active switching to enable path protection over the first optical path 105 ("path 105") and the second optical path 107 ("path 107"). The path protection can include, for example, a 1+1 path protection scheme. For example, the OPS 110 can be configured to receive a first signal or signal instance (e.g., 102A) having a first direction, and further, to transmit a second signal or signal instance (e.g., 101D) having a second direction opposite the first direction, on a first optical path (e.g., path 105) and/or a second optical path (e.g., path 107). In some instances, for example, the OPS 110 can be configured to receive a first signal (e.g., 102A) in an incoming or eastbound direction on a first path (e.g., 105), and to transmit a second signal (e.g., 101D) in an outbound, westbound, or return direction on the first path (e.g., 105), such as shown in FIG. 1A. In other instances, for example, the OPS 110 can be configured to receive a first signal (e.g., 102D) in an incoming or eastbound direction on a path (e.g., 107), and to transmit a second signal (e.g., 101E) in an outbound, westbound, or return direction on a path (e.g., 107), such as shown in FIG. 1B.

The ports 112A-D can individually include, for example, a unidirectional port, a bidirectional port, and the like. In some instances, the second port 112B and the third port 112C can be configured to couple the OPS 110 to a network over optical paths (e.g., path 105, path 107). For example, the second port 112B can be in optical communication with a switch (e.g., switch 130A), to pass, on a first path (e.g., path 105), a first signal or signal instance (e.g., 102A). The third port 112C can be in optical communication with a switch (e.g., switch 130B), to pass, such as shown in FIG. 1B (or block, as shown in FIG. 1A), on a second path (e.g., path 107), a second signal or signal instance (e.g., 102D of FIG. 1B). The fourth port 112D can be in optical communication with an optical coupler (e.g., coupler 120), to pass, on the second path, the first signal or signal instance. The first port 112A can be in optical communication with the optical coupler, to pass, on the first path, the first signal or signal instance. For example, the coupler 120 can be configured to split incoming (e.g., eastbound) signals (e.g., 102A, 102B), into signal instances including a first signal instance (e.g., 102C) and a second signal instance (e.g., 102F).

The coupler 120 ("coupler 120" or "optical coupler 120") represents an optical signal coupler ("coupler" or "optical coupler"). The coupler 120 can be disposed on the transceiver-side of the OPS 110. The coupler 120 can be configured to split and/or forward or combine signals, based on signal direction at the inputs/outputs (I/O) of the coupler 120. For example, the coupler 120 can be configured to split, without wavelength filtering, a signal (e.g., 101A) into a first signal instance (e.g., 101B) and a second signal instance (e.g., 101C), such as shown in FIG. 1A. In some instances, such as in this example, the coupler 120 can be in optical communication with the first port 112A and the fourth port 112D, such as shown in FIG. 1A. As another example, the coupler 120 can be configured to forward, without wavelength filtering, a signal (e.g., 102A-C), such as shown in FIG. 1C. In this example, the coupler 120 can be in optical communication with the first port 112A, such as shown in FIGS. 1A-D.

The switches 130 represent individual optical switches. The switches 130 can be disposed on the line-side of the OPS 110. For example, the switches 130 can be or include a variable optical attenuator, and the like, as described in further detail herein. The switches 130 can be configured to route network traffic (e.g., signals 102A-F, signals 101A-E) over at least one of a first optical path (e.g., 105) or a second optical path (e.g., 107). For example, the switches 130 can be in optical communication with the coupler 120 and can each be configured to be individually switchable between switch states, including, for example, a first state ("first state" or "pass state") and a second state ("second state" or "block state"). Moreover, the first switch 130A can be in optical communication with the second port 112B, and the second switch 130B can be in optical communication with the third port 112C. For example, the first switch 130A, when positioned at or set to the first state, can be configured to pass a signal or signal instance (e.g., 102A on path 105), and further, when positioned at or set to the second state, to block a signal or signal instance. Similarly, the second switch 130B, when positioned at or set to the first state, can be configured to pass a signal or signal instance, and further, when positioned at or set to the second state, to block a signal or signal instance (e.g., 102D on path 107).

In some implementations, the switches 130 can be configured to be interoperable to provide, for example, inverted switch state configurations. For example, when the first switch 130A is positioned at or set to the pass state, the second switch 130B can be caused to be positioned at or set to the block state. As another example, when the first switch 130A is positioned at or set to the block state, the second switch 130B can be caused to be positioned at or set to the pass state. In some implementations, the switches 130 can be configured to provide, for example, directional (optical) signal isolation, isolation from multi-path interference, and the like, via switch state configurations of the switch 130A and the switch 130B.

In operation, the OPS 110 can be configured to implement active switching (e.g., via the first switch 130A and the second switch 130B) to enable and provide path protection over a first optical path (e.g., path 105) and a second optical path (e.g., path 107). In some instances, the OPS 110 can be, in effect, actively configured and reconfigured (e.g., via active switching) to function and operate in different modes in a network (not shown), based on different combinations of switch states of the switches 130 (e.g., inverted switch state configurations). For example, the OPS 110 can be configured to provide, using the active switching, a 1+1 protection scheme over the path 105 and the path 107 such as when the first switch 130A is set to one of the first state (e.g., pass state) or the second state (e.g., block state), and the second switch 130B is set to an opposite (inverse, or inverted) state relative to the state of the first state. Stated differently, when the states of the first switch 130A and the second switch 130B are inverted relative to the state of the other's, a path protection scheme such as a 1+1 path protection scheme can be provided via the OPS 110. Accordingly, the OPS 110 can, in conjunction with another OPS (e.g., corresponding in type to that of the OPS 110) be configured to provide a 1+1 protection over the path 105 and the path 107 using the active switching.

As an example, the OPS 110 can be a first OPS configured to couple, over the first optical path (e.g., path 105) and the second optical path (e.g., path 107), to a network via coupling to a second OPS in the network, where a type of the second OPS corresponds to the type of the first OPS. The first OPS can be a tail-end optical switch and the second OPS can be a head-end optical switch. The first OPS and the second OPS can each include, for example, a first switch (e.g., switch 130A) and a second switch (e.g., switch 130B). The first OPS can be configured to provide, in conjunction with the second OPS, a 1+1 protection scheme over the first optical path and the second optical path where, for example, the first switch and the second switch of the first OPS are set to pass and block or block and pass, respectively, and the first switch and the second switch of the first OPS are both set to pass. Accordingly, the first OPS can be configured to implement and provide an active, single-ended switching operation to provide, in conjunction with the second OPS, a 1+1 protection scheme over the first optical path and the second optical path, as described in further detail herein with reference to FIGS. 2A-B.

In some implementations, a type of the second OPS may not correspond to the type of the first OPS. As an example, in some instances, the second OPS can include a coupler (e.g., coupler 120), such as a variable coupler (e.g., splitter configured to provide 50/50 beam splitting), or the like. Further, in this example, the first OPS can include a coupler (e.g., coupler 120) such as a switch (e.g., 2×1 switch), variable coupler (e.g., configured to provide 0/100 or 100/0 beam splitting), or the like. The coupler (e.g., coupler 120) can otherwise include any suitable type of optical switch or coupler, in accordance with embodiments of the present disclosure.

In some implementations, the OPS 110 can be configured to operate in a four-port operating mode, such as shown in FIGS. 1A-B. For example, with reference to FIG. 1A, the OPS 110 can be configured, in operating in the four-port operating mode, to receive (e.g., at port 112B) a first signal (e.g., 102A) having a first direction, and further, to send or transmit a second signal (e.g., 101D) having a second direction opposite the first direction, on at least one of a first optical path (e.g., 105) and a second optical path (e.g., 107). In some implementations, the OPS 110 can be configured to couple (e.g., at port 112A) to an optical transceiver such as a bidirectional transceiver. In some implementations, the OPS 110 can alternatively or otherwise be configured to couple (e.g., at port 112A and port 112D) to an optical transceiver such as a unidirectional transceiver. For example, the OPS 110 can be configured to couple, at port 112A, to a first port of a unidirectional transceiver to transmit signals, and at port 112D to a second port of a unidirectional transceiver to receive (or detect) signals. In some implementations, when the OPS 110 is configured to operate in the four-port operating mode, the ports (e.g., 112A, 112D) can be or include, for example, a unidirectional port (e.g., configured to couple the OPS 110 to a unidirectional transceiver), a bidirectional port (e.g., configured to couple the OPS 110 to a bidirectional transceiver), and the like.

In some implementations, the OPS 110 can be configured to operate in a first three-port operating mode, such as shown in FIG. 1C. For example, with reference to FIG. 1C, the OPS 110 can be configured, in operating in the first three-port operating mode, to receive a first signal (e.g., 102A) having a first direction, and further, to send or transmit a second signal (e.g., 101D) having a second direction opposite the first direction, on at least one of a first optical path (e.g., 105) and a second optical path (e.g., 107). In such implementations, the port 112A can be or include a bidirectional port, and the like.

In some implementations, the OPS 110 can be configured to operate in a second three-port operating mode, such as shown in FIG. 1D. For example, with reference to FIG. 1D, the OPS 110 can be configured, in operating in the second three-port operating mode, to receive a first signal (e.g., 102A) having a first direction, and further, to send or transmit a second signal (e.g., 101D) having a second direction opposite the first direction, on at least one of a first optical path (e.g., 105) and a second optical path (e.g., 107). In such implementations, the port 112A can be or include a bidirectional port, and the like. In some implementations, the OPS 110 can include a coupler such as coupler 120 that can be or include, for example, a 1×2 optical switch, a coupler having an optical (path) switching capability (e.g., similar to that of switches 130), and the like. For example, the coupler 120 can be or include a variable optical attenuator such as a Mach-Zehnder interferometer (MZI). In other implementations, the OPS 110 can include the coupler 120 and the switches 130 and can be configured such that the switches 130 are both set to pass.

In some implementations, such as shown in FIG. 1A, the port 112A can be configured to couple to a receive path (e.g., at OPS 110 transceiver-side), the port 112B can be configured to couple to a (line-side) working path (e.g., 105), the port 112C can be configured to couple to a (line-side) protect path (e.g., 107), and the port 112D can be configured to couple to a transmit path (e.g., at OPS 110 transceiver-side). In some implementations, the port 112B can instead be configured to couple to a (line-side) protect path (e.g., 107), and the port 112C can instead be configured to couple to a (line-side) working path (e.g., 105). The OPS 110 can be configured (e.g., in four-port operating mode) to, for example, couple to a bidirectional transceiver, a unidirectional transceiver, and/or the like. For example, the unidirectional transceiver can include a two port unidirectional transceiver—one port of which may be coupled to a receive path and the other port of which coupled to a transmit path.

In some implementations, such as shown in FIGS. 1C-D, the port 112A can be configured to couple to a common, bidirectional receive/transmit path (e.g., at OPS 110 transceiver-side), the port 112B can be configured to couple to a (line-side) working path (e.g., 105), and the port 112C can be configured to couple to a (line-side) protect path (e.g., 107). In some implementations, the port 112B can instead be configured to couple to a (line-side) protect path (e.g., 107), and the port 112C can instead be configured to couple to a (line-side) working path (e.g., 105). The OPS 110 can be configured (e.g., in three-port operating mode) to couple to a bidirectional transceiver. In some instances, such as when the OPS 110 (e.g., at a tail-end) is coupled to a corresponding OPS (e.g., such as the OPS 110 at a head-end), the corresponding OPS can include switches (e.g., switches 130) configured such that the switches are both set to pass, while the OPS 110 (e.g., at the tail-end) can be configured such that the working and protect paths can be selected based on the switch configurations of the switches 130. In such instances, the corresponding OPS (e.g., at the head-end) can include a 2×1 or 2×2 splitter (e.g., coupler 120).

Figure 2A:
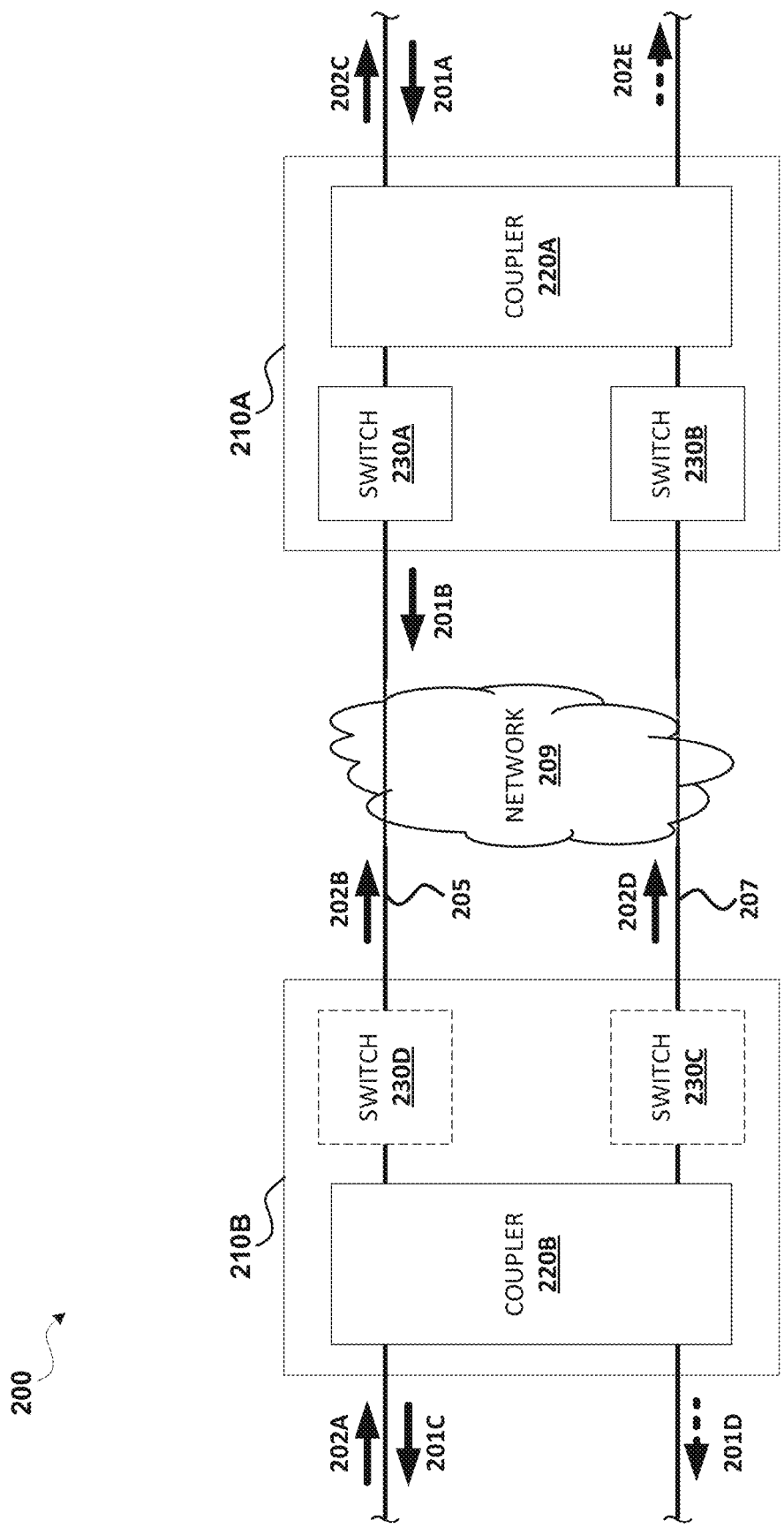
FIGS. 2A-B are functional block diagrams depicting a switch system, in accordance with an embodiment.
Figure 2B:
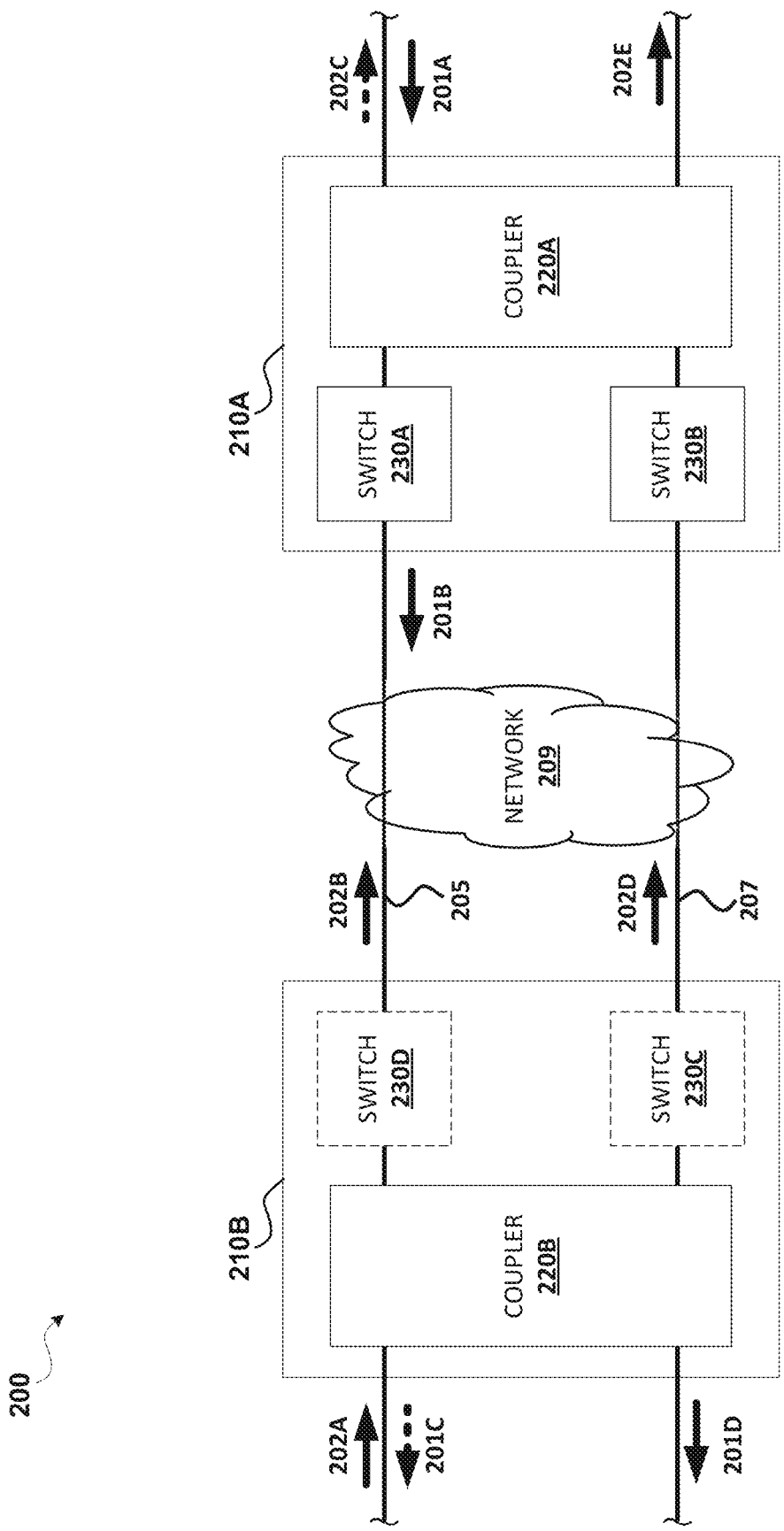

FIGS. 2A-B are functional block diagrams depicting a switch system 200. The switch system 200 represents an active path protection switch system. As shown, the switch system 200 includes OPS 210A (e.g., at or of a tail-end node) and OPS 210B (e.g., at or of a head-end node), interconnected over network 209, via first optical path 205. FIG. 2A shows the switch system 200 where the OPS 210A and the OPS 210B include bidirectional (transceiver-side) ports. FIG. 2B shows the switch system 200 where the OPS 210A and the OPS 210B include unidirectional (transceiver-side) ports. While the switch system 200 is shown as including a number of discrete devices and components (e.g., OPS 210A, OPS 210B), other arrangements are possible. For example, the switch system 200 can be suitably formed of any number of integrated or modular devices.

The switch system 200 can be configured to operate, for example, in, of, or in association with an access network (not depicted), such as a PON, WDM PON, dense wave-division multiplexed PON (DWDM PON), or the like, such as to support and maintain communications across the access network. The access network can include any suitable network topology or combination of network topologies, any of which can be physical, logical, or virtual, including, for example, a point-to-multipoint (P2M) network topology, a point-to-point (P2P) network topology, and the like. The switch system 200 may otherwise include or be configured to operate in any suitable or compatible type of access network having any suitable network topology, architecture, or characteristic, in accordance with embodiments of the present disclosure.

In some implementations, network 209 can include, for example, an intranet, a local area network (LAN), a personal area network (PAN), a metropolitan area network (MAN), a backhaul network, a fronthaul network, a long-haul network, and/or a wide area network (WAN) such as the Internet, and can include wired and/or fiber optic connections. With reference to FIG. 2A, the signal 202D represents a control signal. With reference to FIG. 2B, the signal 202D represents a control signal. In some implementations, network 209 includes a bidirectional communications network. In general, network 209 can include any combination of connections and protocols configured to support communications between nodes (e.g., at which OPS 210A and OPS 210B are disposed). For example, network 209 can include, for example, an access network such as a passive optical network, an optical access network, and the like.

The path 205 and the path 207 represent respective and individual links or communication channels. The path 205 and the path 207 can be functionally and/or structurally similar to the path 105 and/or the path 107, respectively, as described herein. For example, the path 205 and/or the path 207 can include one or more unidirectional paths, bidirectional paths, and the like. In general, the path 205 and/or the path 207 may otherwise respectively and individually include any suitable type of communication channel, as such can be used in an optical access network such as a PON, WDM PON, and the like. Moreover, the path 205 and/or the path 207 may otherwise each respectively be configured to transmit or carry any suitable type of signal as such can be used in an optical communications system (e.g., optical communications system 100), in accordance with embodiments of the present disclosure.

The OPS 210A and the OPS 210B represent respective optical path protection switches. The OPS 210A and the OPS 210B can be, in some instances, functionally and/or structurally similar to the OPS 110, such as described herein. For example, in some instances, the OPS 210A can include coupler 220A, switch 230A and switch 230B (collectively, "switch(es) 230A-B"), and the OPS 210B can include coupler 220B, and optionally, switch 230D and switch 230C (collectively, "switch(es) 230C-D").

The OPS 210A can be a first OPS configured to couple, over the path 205 and the path 207, to a network (e.g., access network, bidirectional network) via coupling to a second OPS (e.g., OPS 210B) in the network, a type of the second OPS corresponding to the type of the first OPS. The first OPS can be configured to couple to the network via coupling to the second OPS. For example, the OPS 210A can be configured to provide active switching to enable path protection over the path 205 and the path 207, such as based on different combinations of switch states of the switches 230, such as described herein. For example, the OPS 210A can be configured to provide, using the active switching, a 1+1 protection scheme over the path 205 and the path 207 such as described herein. For example, in some instances, the first OPS 210A can be a tail-end optical switch, the second OPS can be a head-end optical switch, and the network includes a passive optical network. The network can include a bidirectional network.

For example, a tail-end optical switch (e.g., OPS 210A) can be configured to be coupled to an access network (not shown) such as a broadcast star network, or the like, that couples the tail-end optical switch to a head-end optical switch (e.g., OPS 210B) by a primary bidirectional optical path (e.g., path 205) and a second bidirectional optical path (e.g., path 207). The tail-end optical switch has a first optical switch (e.g., switch 230A) and a second optical switch (e.g., switch 230B) that can be configured to provide active switching. The tail-end optical switch can be configured to provide path protection such as a 1+1 protection over the primary bidirectional optical path and the second bidirectional optical path using the active switching without active switching at the head-end optical switch.

In some embodiments, the first OPS and the second OPS can be substantially similar or identical, or otherwise, of a corresponding type. For example, the first OPS and the second OPS can include one or more substantially similar or identical components (e.g., OPS 210A includes coupler 220A, switches 230A-B; OPS 210B includes coupler 220B, switches 230C-D). In other embodiments, the first OPS and the second OPS can be different. For example, in some instances (e.g., when the OPS 210 is coupled to a bidirectional transceiver), the OPS 210B can be configured to function as a 1×2 coupler (e.g., switches 230C-D both set to pass). This is advantageous in that this embodiment can provide effectively active optical path protection that is implemented by effectively passive network components at the head end. In other instances (e.g., when the OPS 210 is coupled to a unidirectional transceiver), the OPS 210B can be configured to function as a 2×2 coupler or a 1×2 coupler, depending on a transceiver type in which the OPS 210B is implemented (e.g., OPS 210 includes 1×2 coupler when configured to be coupled to bidirectional transceiver; OPS 210 includes 2×2 coupler when configured to be coupled to unidirectional transceiver).

In an embodiment, the optical coupler (e.g., coupler 220A) is configured to (i) split, without wavelength filtering, traffic (e.g., signals 201, 202) on at least one of a primary bidirectional optical path (e.g., path 205) or a second bidirectional optical path (e.g., path 207), and (ii) combine, without wavelength filtering, traffic from the primary bidirectional optical path and the second bidirectional optical path. A first switch (e.g., switch 230A) can be in optical communication with the optical coupler, and can be switchable between a first state and a second state, where the first switch can be configured to pass network traffic while the first switch is in the first state, and block network traffic while the first switch is in the second state. A second switch (e.g., switch 230B) can be in optical communication with the optical coupler and can be switchable between the first state and the second state, where the second switch can be configured to be switched to the first state when the first switch is in the second state, and to the second state when the first switch is in the first state. The second switch can be configured to pass network traffic when the second switch is in the first state, and to block network traffic when the second switch is in the second state.

In some embodiments, the OPS 210B can be disposed, for example, at a head end (e.g., at an upstream node) of a communications path (e.g., path 205, path 207), and the OPS 210A can be disposed, for example, at a tail end (e.g., at a downstream node) of the communications path. In some implementations, the OPS 210B can be configured such that both switches (e.g., switches 230C-D) are set to pass, while the OPS 210A can be configured (e.g., based on paths selected for primary/secondary and/or working/protect communications paths) such that when one of the switches (e.g., switch 230A or switch 230B) is set to pass, the other of the switches (e.g., other of the switch 230A or the switch 230B) is set to block; and when the one of the switches is set to block, the other of the switches is set to pass (i.e., switch states of switches 230A-B are inverted relative to each other).

In an embodiment, the tail-end optical switch (e.g., OPS 210A) is an optical protection switch (OPS) configured to receive a first signal (e.g., 202B or 202D) having a first direction and transmit a second signal (e.g., 201B) having a second direction opposite the first direction on at least one of the primary bidirectional optical path and the second bidirectional optical path.

In an embodiment, the tail-end optical switch can be configured to detect, based on traffic (e.g., in a broadcast star network), an optical path failure event on the primary bidirectional optical path or the second bidirectional optical path. Further, the tail-end optical switch can be configured to actuate, in response to detecting the optical path failure event and to provide the active switching, (i) the first optical switch to set the first optical switch to one of the first state or the second state, and (ii) the second optical switch to set the second optical switch to the other one of the first state or the second state opposite that of the first optical switch.

In an embodiment, the head-end optical switch can be an OPS (e.g., OPS 210B), of a type corresponding to the type of the tail-end optical switch. For example, the OPS 210B can be implemented in or as part of a head-end device (e.g., transmit end) in the access network, configured to transmit or broadcast signals 202B and 202D via the path 205 (e.g., primary communications path) and the path 207 (e.g., secondary communications path), respectively. In this example, the OPS 210A can be implemented in or as part of a tail-end device in the access network, configured to support and provide active switching to provide path protection over the path 205 and the path 207, as described herein. This provides a simplified path protection scheme in that the path protection can be activated from the tail-end device (e.g., receive end) without involving active switching at the head-end device (e.g., the transmitting end).

In some instances, the head-end optical switch can be configured as a beam splitter. As an example, the head-end optical switch can be configured to function as a beam splitter when switches at or of the head-end optical switch (e.g., switches 230C-D) are both set to pass, such as in FIGS. 2A-B. As another example, the head-end optical switch can be configured to function as a beam splitter when switches at or of the head-end optical switch (e.g., switches 230C-D)

are not present (e.g., lacking from the head-end optical switch), such as in FIG. 1D. In these examples, the tail-end optical switch can be configured to provide, via a single-ended switching operation and in conjunction with the head-end optical switch, path protection over path 205 and path 207 (e.g., switch 230A set to pass while switch 230B set to block; or switch 230A set to block while switch 230B set to pass). For example, the tail-end optical switch can be configured to provide path protection by setting switch 230A to pass (e.g., path 205 is the working path) and setting switch 230B to block (e.g., path 207 is the protect path).

The first OPS or tail-end optical switch (e.g., OPS 210A) can be configured to detect, based on network traffic (e.g., including signals 201-202) over a first optical path (e.g., path 205) and a second optical path (e.g., path 207), an optical path failure event (e.g., on at least one of the first optical path or the second optical path). In response to detecting the optical path failure event, the first OPS can be configured to cause actuation of the first and second switches (e.g., switch 230A-B) to, for example, (i) set the second switch (e.g., switch 230B) to one of the first state or the second state, and (ii) set the first switch (e.g., switch 230A) to the first state when the second switch is set to the second state, or to the second state when the second switch is set to the first state—depending on which of the first optical path and the second optical path the optical path failure event occurs.

In some embodiments, the path protection can be implemented in a star distribution network to provide diverse path protection switching. The diverse path protection switching can be supported by elements (e.g., OPS 210A, OPS 210B) using passive elements in the path. In an optical access network, a communication path (e.g., 205, 207) can be protected or unprotected from fault—that is, protected against a single fault or failure, or to one or more failures. The optical switches in protected circuits detect path faults or failures, and in some events, respond to the faults via one or more diverse path protection switching techniques. A diverse path protection switching technique can include, for example, executing (e.g., via OPS 210) a path protection operation to switch and route traffic (signals) between a primary (e.g., 205) and secondary path (e.g., 207) in a network (e.g., network 209). Diverse path protection switching provides path redundancy and can be implemented to mitigate (and in some instances, prevent) disruptions on communications that would otherwise occur in the event of, for example, a fault of a communications link including a single path between nodes. The OPS (e.g., 210) is configured to implement diverse path protection switching to provide path protection over the primary and secondary path.

In this example, the head-end device can include (e.g., functionally) a 2×2 coupler. In some instances, the head-end device can alternatively include (e.g., functionally) a 1×2 coupler (e.g., in case signal splitting is sufficient). The tail-end device can include a 1×2 switch and a bi-directional Multiplexer/Demultiplexer (MD) coupler. This is an alternative to the 1×1 switches and 2×2 coupler where the 2×2 coupler forms the basis of the bi-directional MD as well. In this example, the optical coupler can be a bidirectional MD coupler (or coupling). The head-end functions as a splitter, with all the path selection done at the tail-end. This allows a simplified structure that is also compatible with the "star" network (splitter based) distribution architecture of WDM PON. When used with coherent WDM PON, this provides a very simple deployment as the frequency (channel) selection can now be done by the transceiver.

In some implementations, the head-end optical switch can be an OPS such as OPS 210B, which can be of a type that corresponds to the type of the tail-end optical switch. In such implementations, the tail-end optical switch can be an OPS such as OPS 210A. In such implementations, couplers (e.g., coupler 220) of each switch can be, for example, 2×1 couplers in the case of using a 3 port configuration with a bidirectional optical transceiver. In such implementations, couplers (e.g., coupler 220) of each switch can alternatively be, for example, 2×2 couplers in the case of using a 4 port configuration with a bidirectional optical transceiver or a unidirectional optical transceiver. In some implementations, the head-end optical switch can be configured to function as a 1×2 or 2×2 splitter (e.g., in a star distribution network and with both switches 230C-D set to pass).

FIGS. 3-6 are functional block diagrams depicting a first example switch system 300, configured to operate in various modes in a network (not shown), in accordance with an embodiment. The first example switch system 300 can be functionally and/or structurally similar to any switch system described herein (e.g., switch system 200). The network can include, for example, a redundant star network (not shown). The first example switch system 300 can be configured to provide, for example, diverse path protection over fully independent optical paths A and B (e.g., similar to path 205, path 207). For example, as shown, the diverse path protection can be provided over (communication) paths A.1, A.2, B.1, and B.2. The paths A.1, A.2, B.1, and B.2 can be defined and/or share endpoints (e.g., Head End (HE), an optical distribution center (ODC), Tail End (TE)), such as shown in FIGS. 3-6. The ODC may include, for example, a data center, a telecommunication hub, and the like.

Figure 3:
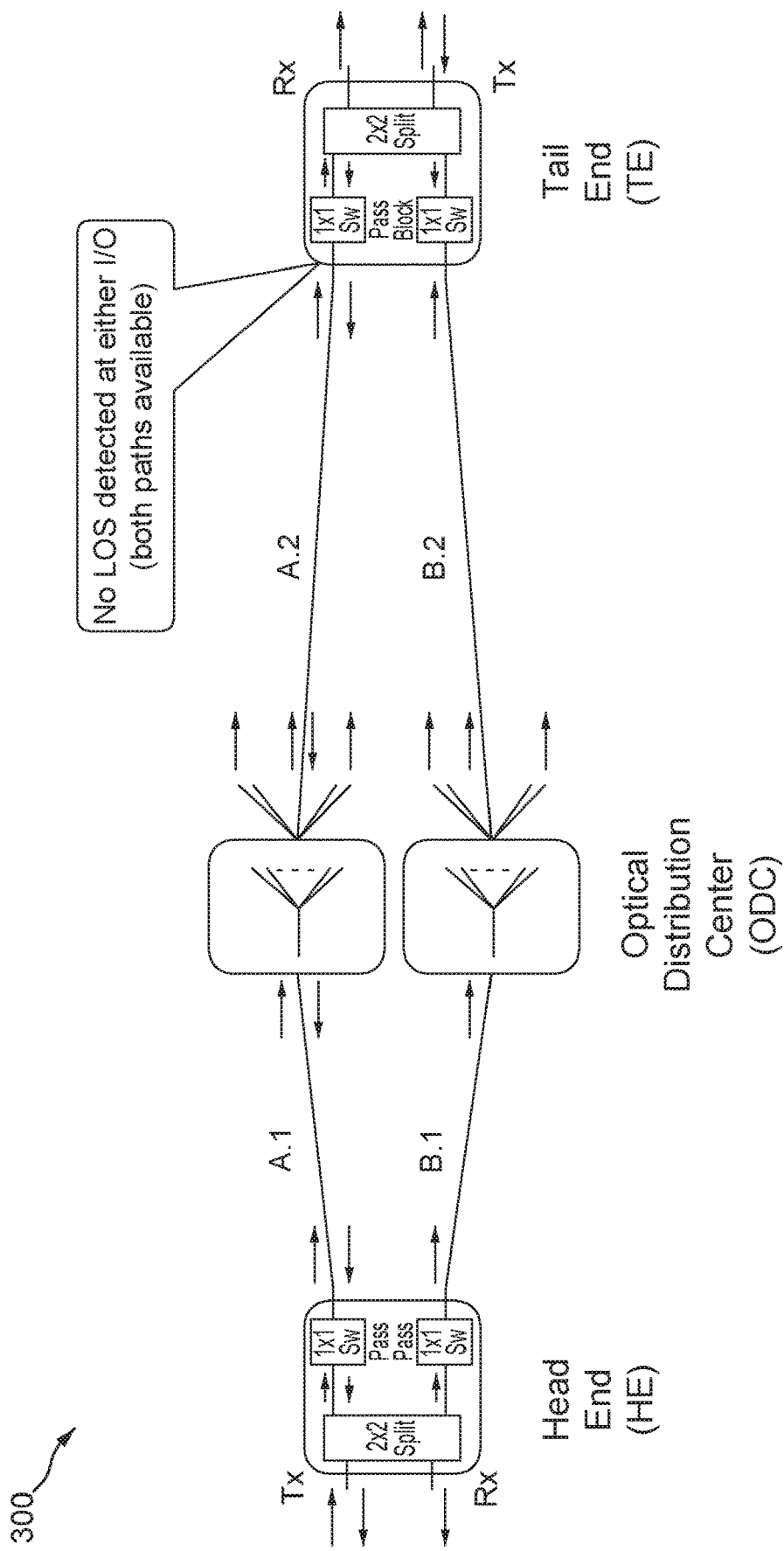
FIGS. 3-6 are functional block diagrams depicting a first example switch system configured to operate in various modes in a network, in accordance with an embodiment.

With reference to FIG. 3, under normal operation (e.g., of network), path A.1:A.2 can be used for bi-directional (signal) transmission. Path B.1:B.2 carries eastbound HE test signals (eastbound TE reserves path B.1:B.2 on operational standby). A switch at TE is selected to send westbound or return signals via A2:A1 to HE. Under normal operation, the switch system 300, via a first OPS (e.g., at TE) can be configured to detect (e.g., via OPS 210) disruption or loss of signal (LOS) at TE. If no LOS is detected (e.g., via OPS 210) at TE, both paths are available.

Figure 4:
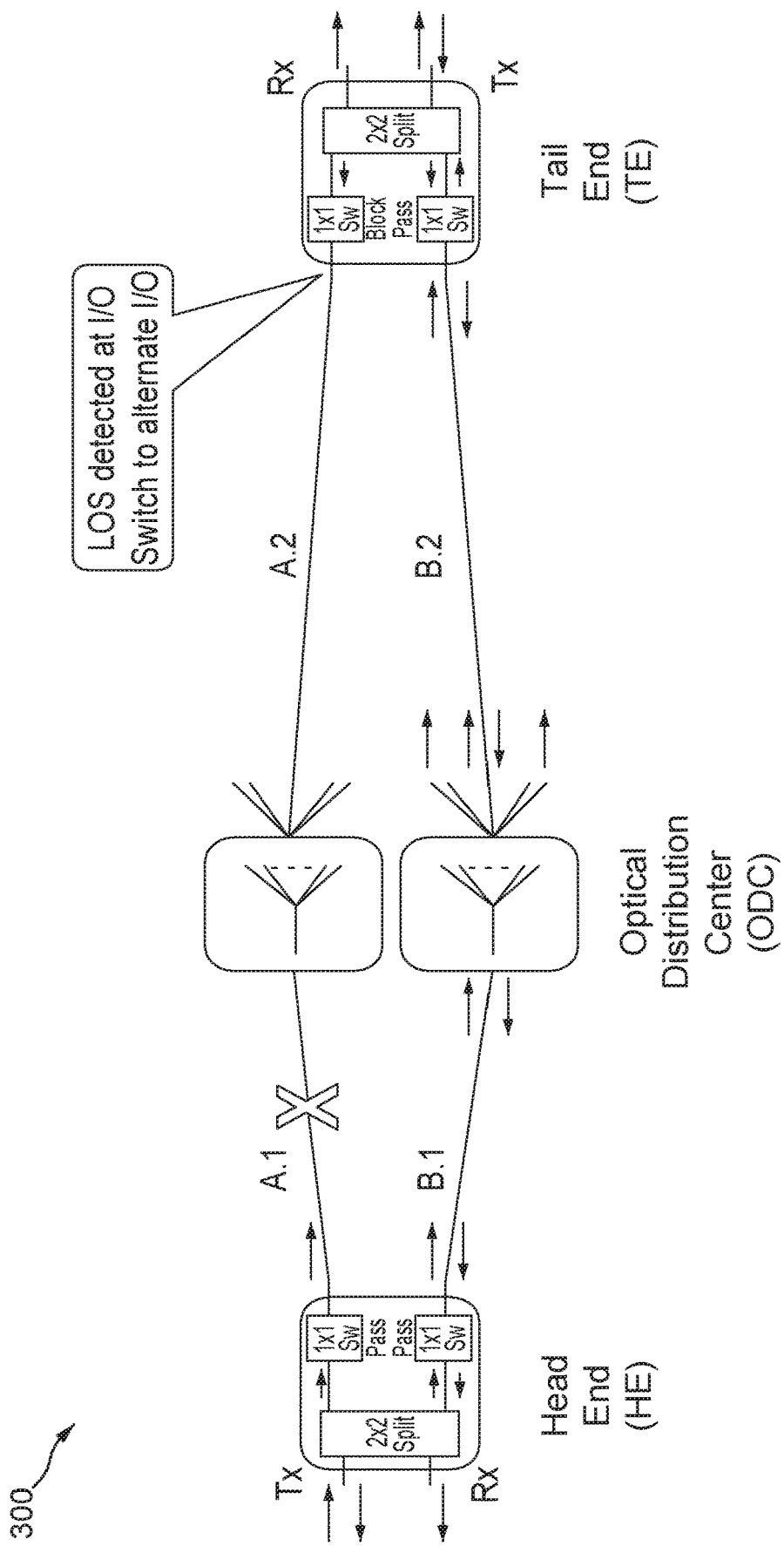

FIG. 4 shows an example where a path failure event (e.g., in/of network) occurs on path A.1. The path failure event is detected based on LOS at the TE. The detected LOS causes the tail-end optical switch at TE (e.g., similar to OPS 210A) to invert switch state (e.g., switch 230A set to pass and switch 230B set to block, or switch 230A set to block and switch 230B set to pass). Accordingly, the tail-end optical switch at TE can be selected to send westbound or return signal via path B2:B1 to the head-end optical switch at HE (e.g., similar to OPS 210B). Path A.1 carries the eastbound HE test signal (which does not reach TE due to fault); therefore, LOS is detected via an OPS (e.g., OPS 210) at TE, which is configured to provide (or establish) the diverse path switching in response. In some implementations, in response to detecting, for example, a LOS, and the like, an OPS can be configured to execute a single-ended switching operation to provide diverse path switching between paths (e.g., between paths A.1 and B1).

Figure 5:
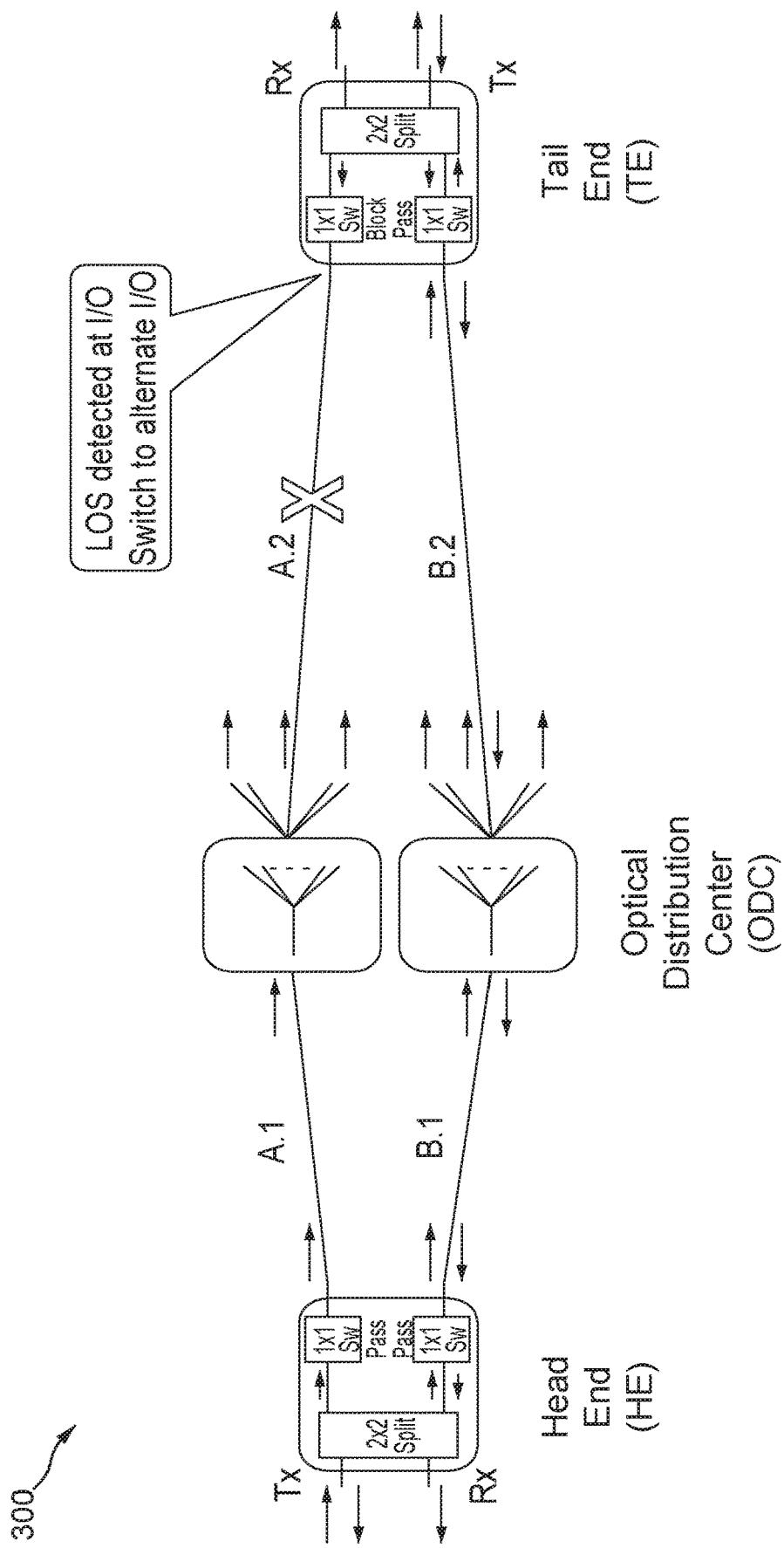

FIG. 5 shows an example where a path failure event (e.g., in/of network) occurs on path A.2. The path failure event is detected based on LOS at the TE. The detected LOS causes the TE device (e.g., similar to OPS 210A) to invert switch state, such as described herein. Accordingly, the tail-end optical switch at TE can be selected to send westbound or return signal via path B2:B1 to HE. Path A.1:A.2 carries the eastbound HE test signal (which does not reach TE due to fault); therefore, LOS is detected via an OPS (e.g., OPS 210)

at TE and the OPS provides the single-ended diverse path switching, as described herein.

Figure 6:
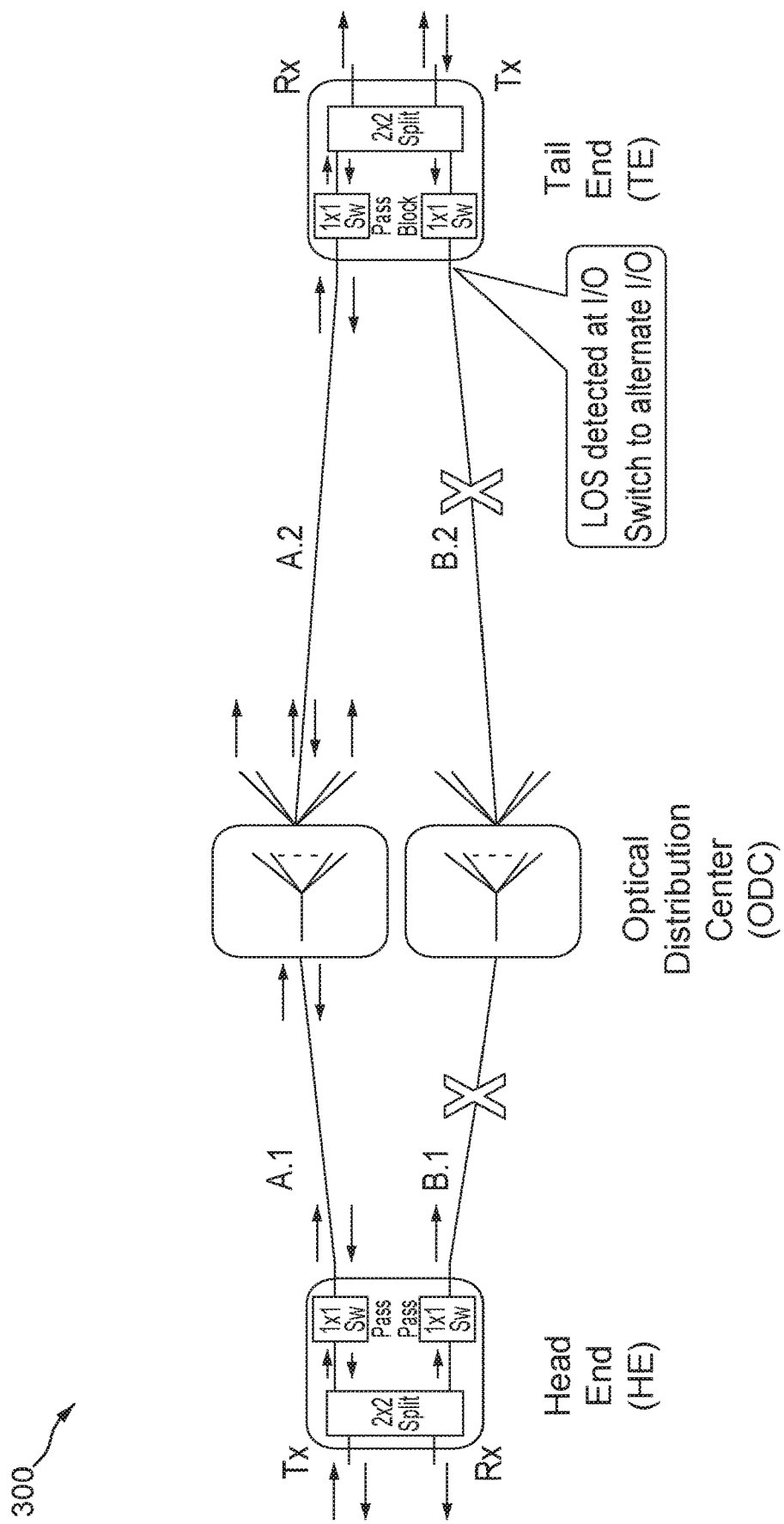

FIG. 6 shows an example where a path failure event (e.g., in/of network) occurs on paths B.1 and B.2. The path failure event is detected based on LOS at the TE in a manner similar to that described with reference to FIGS. 4-5. That is, the switch system 300 can be configured to respond in a similar way to any failure on any one of the A or B paths.

FIGS. 7-10 are functional block diagrams depicting a second example switch system 700, configured to operate in various modes in a network (not shown), in accordance with an embodiment. The switch system 700 can be functionally and/or structurally similar to any switch system described herein (e.g., switch system 200). The network can include, for example, a partially redundant star network.

As shown, the first example switch system 700 includes a head-end optical switch at a head end (HE) interconnected to a tail-end optical switch at TE over an optical distribution center (ODC). The switch system 700 can be configured to provide (e.g., via OPS 210) diverse path protection over partially independent optical paths A and B (e.g., similar to path 205, path 207). For example, as shown, the diverse path protection can be provided over paths A.1, A.2, and B.2. In this example, exposure to risk of failure (e.g., of path A.1) is shared between the HE and the ODC via the diverse path switching (e.g., provided by OPS 210).

Figure 7:
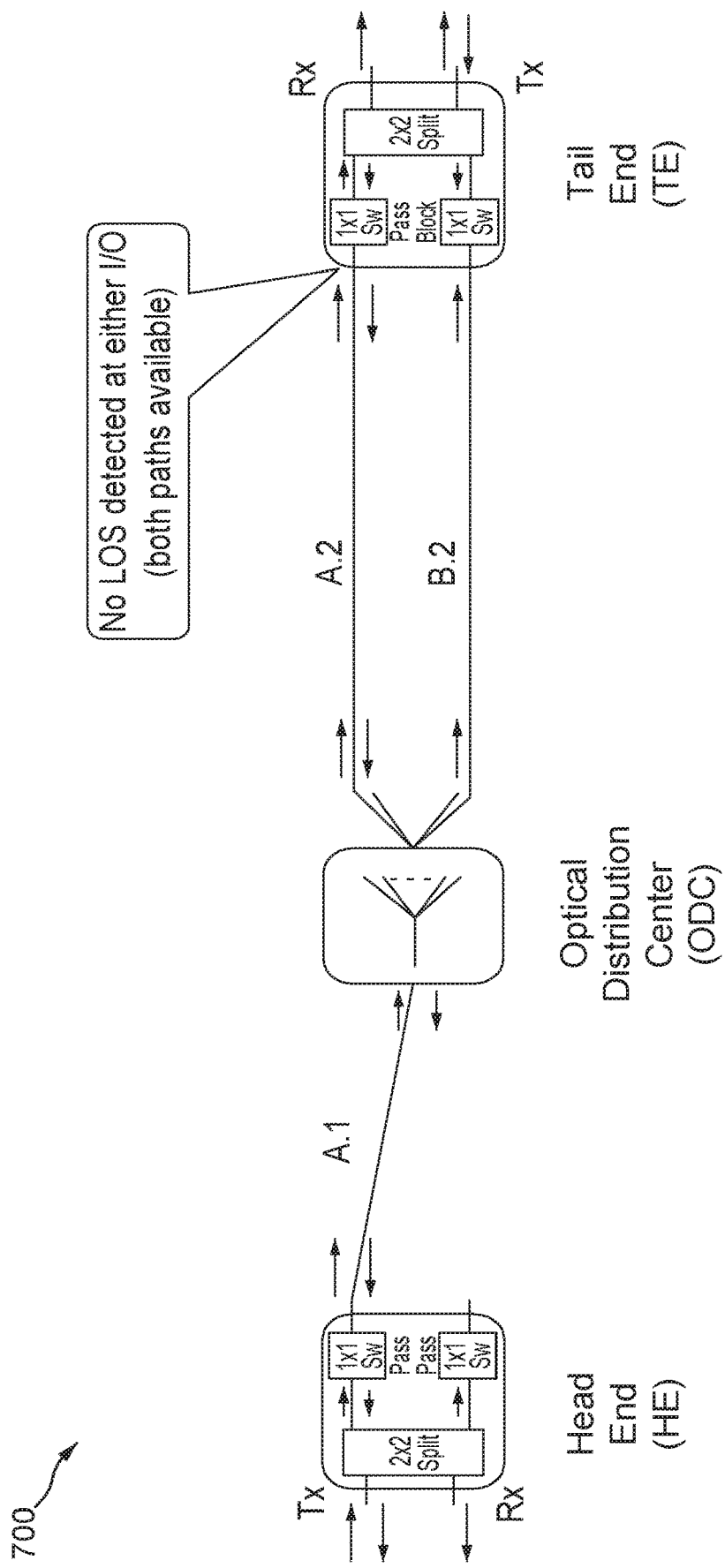
FIGS. 7-10 are functional block diagrams depicting a second example switch system configured to operate in various modes in a network, in accordance with an embodiment.

With reference to FIG. 7, under normal operation (e.g., of network), path A.1:A.2 can be used for bi-directional (signal) transmission. Path A.1:B.2 carries the eastbound HE test signal (TE reserves path on operational standby). A switch (e.g. tail-end optical switch) at TE is selected to send westbound or return signal via A2:A1 to HE. Under normal operation, a first OPS (e.g., at the tail end (TE)) can be configured to detect any disruption or loss of signal (LOS) at either input/output. In the case of no LOS, no LOS is detected, indicating both paths are available and no fault is present.

Figure 8:
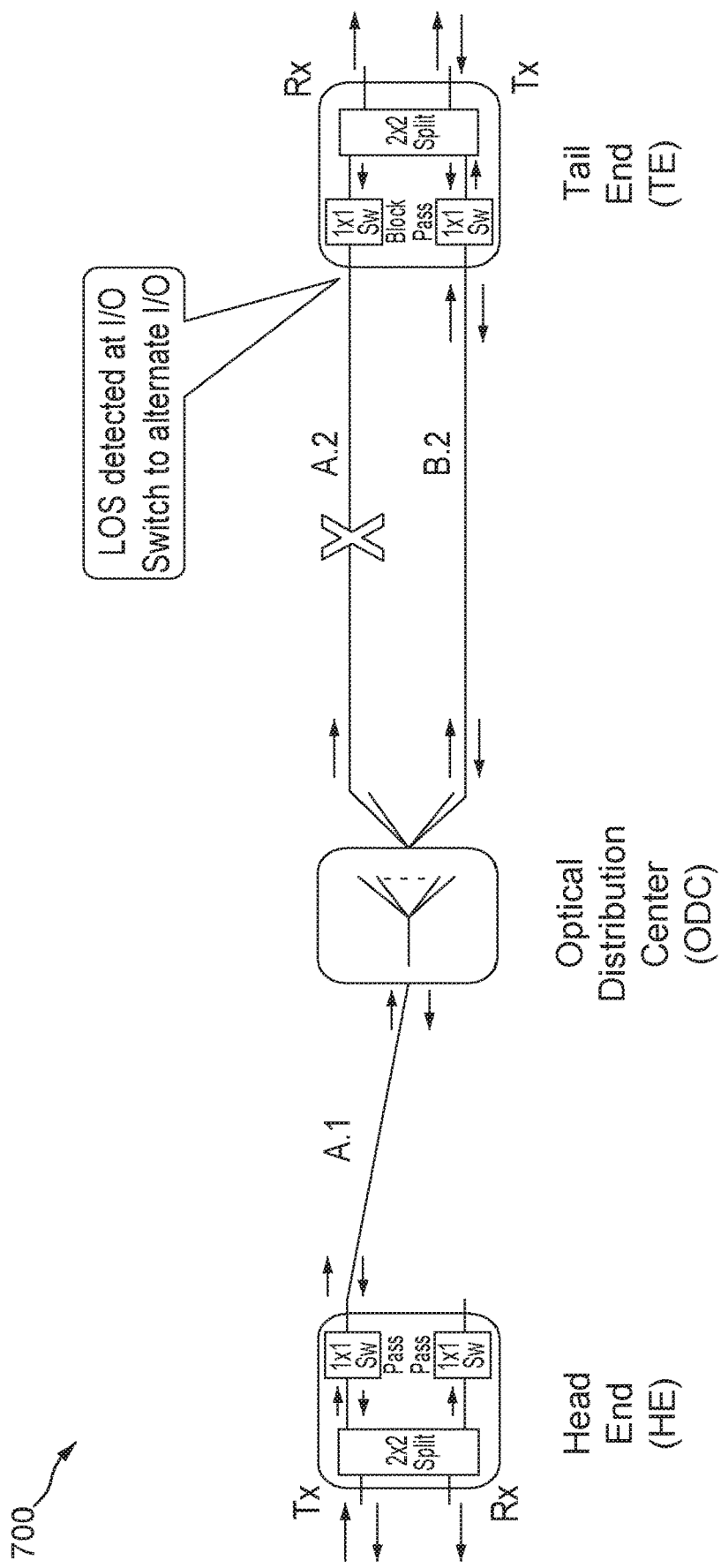

FIG. 8 shows an example where a path failure event (e.g., in/of network) occurs on path A.2. The path failure event is detected based on LOS at the TE. The detected LOS causes the TE device (e.g., similar to OPS 210A) to invert switch state (e.g., switch 230A set to pass and switch 230B set to block, or switch 230A set to block and switch 230B set to pass). Accordingly, the tail-end optical switch at TE is selected to send westbound or return signal via B2:A1 to HE (e.g., OPS 210B). Path A.1:A.2 carries the eastbound HE test signal (which does not reach TE due to fault); therefore, LOS is detected at TE, and OPS (e.g. OPS 210) provides the diverse path switching in response.

Figure 9:
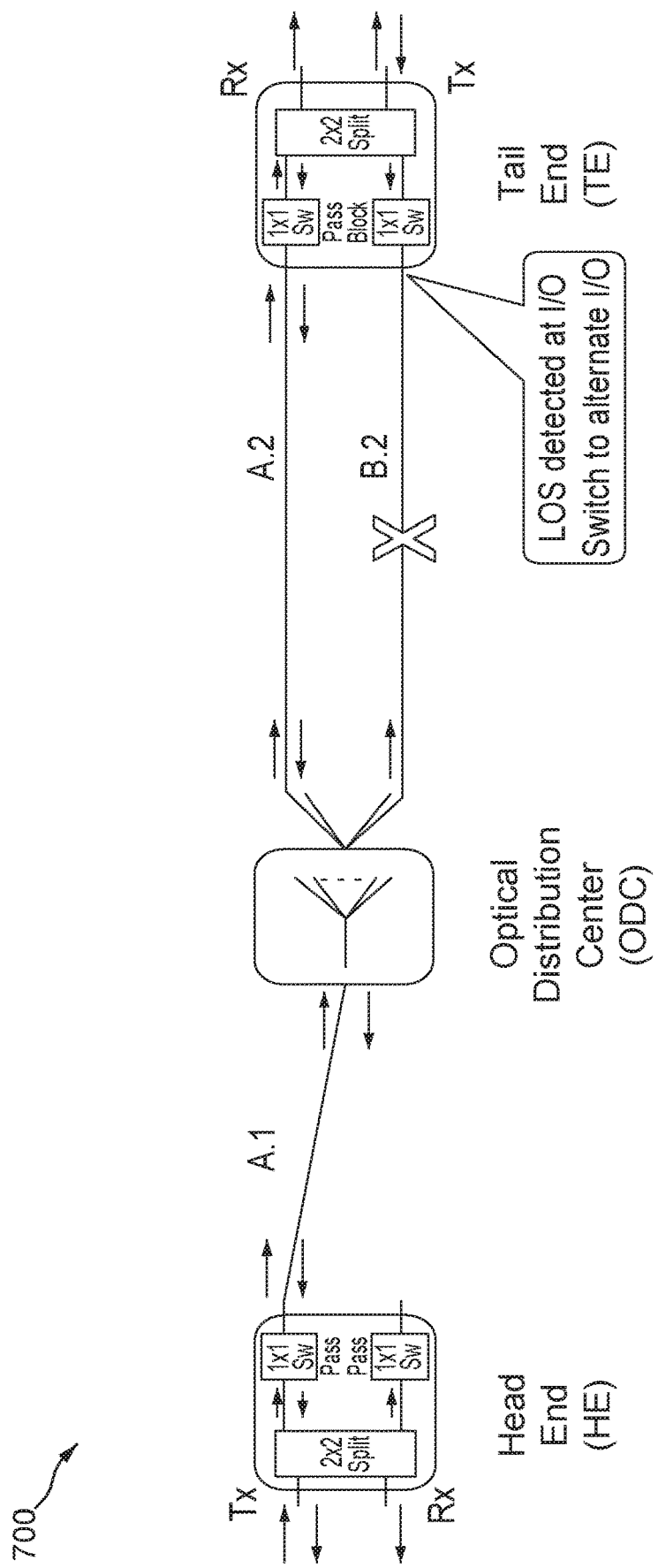

FIG. 9 shows an example where a path failure event (e.g., in/of network) occurs on path B.2. The path failure event is detected based on LOS at the TE. The detected LOS causes the TE device (e.g., similar to OPS 210A) to invert switch state. Accordingly, the tail-end optical switch at TE is selected to send westbound or return signal via A2:A1 to HE (e.g., similar to OPS 210B). Path A.1:B.2 carries the eastbound HE test signal (which does not reach TE due to fault); therefore, LOS is detected at TE, and an OPS (e.g. OPS 210) provides the diverse path switching.

Figure 10:
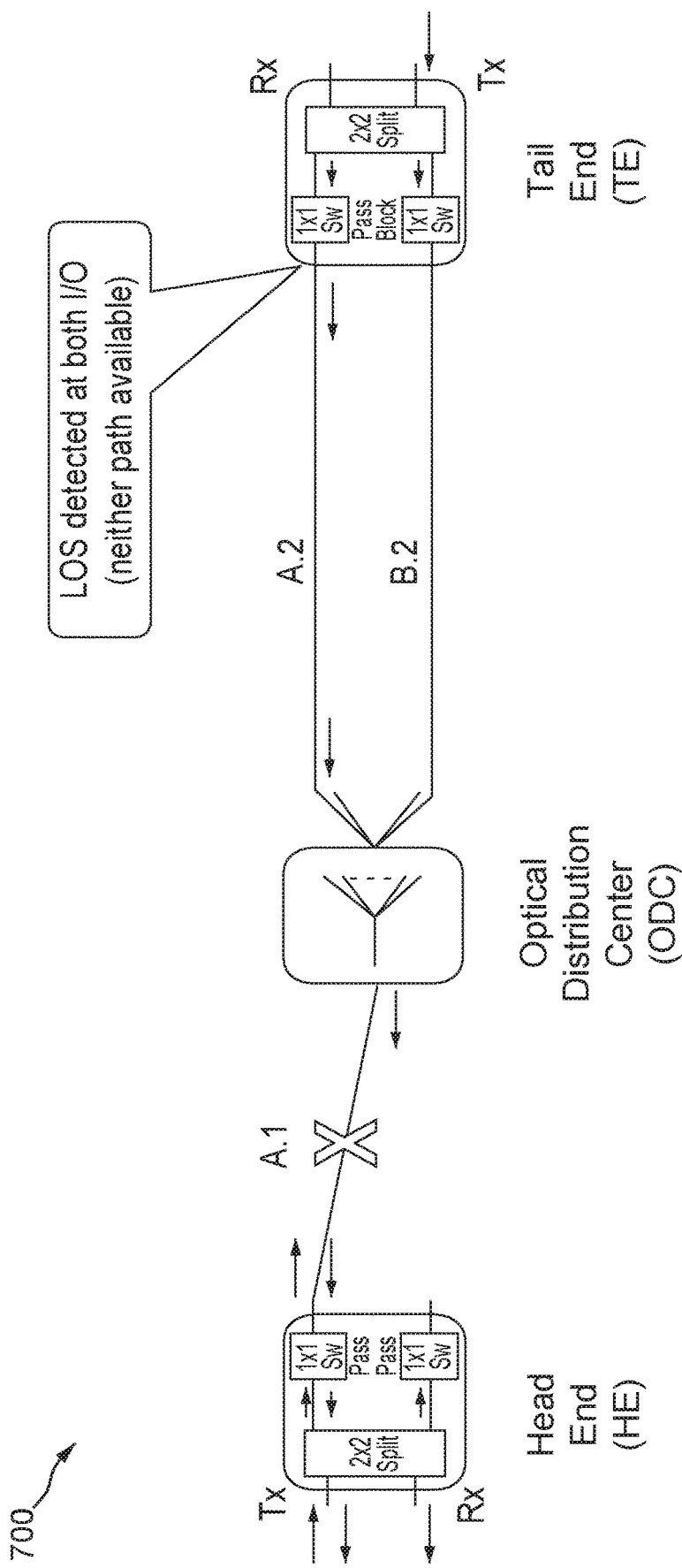

FIG. 10 shows an example where a path failure event (e.g., in/of network) occurs on path A.1. The path failure event is detected (e.g., via OPS 210) based on LOS at the TE. The path failure event affects both paths (e.g., A2 and B.2) at TE (e.g., preventing the use of diverse path switching between paths A.2 and B.2 in resolving the path failure event).

Figure 11:
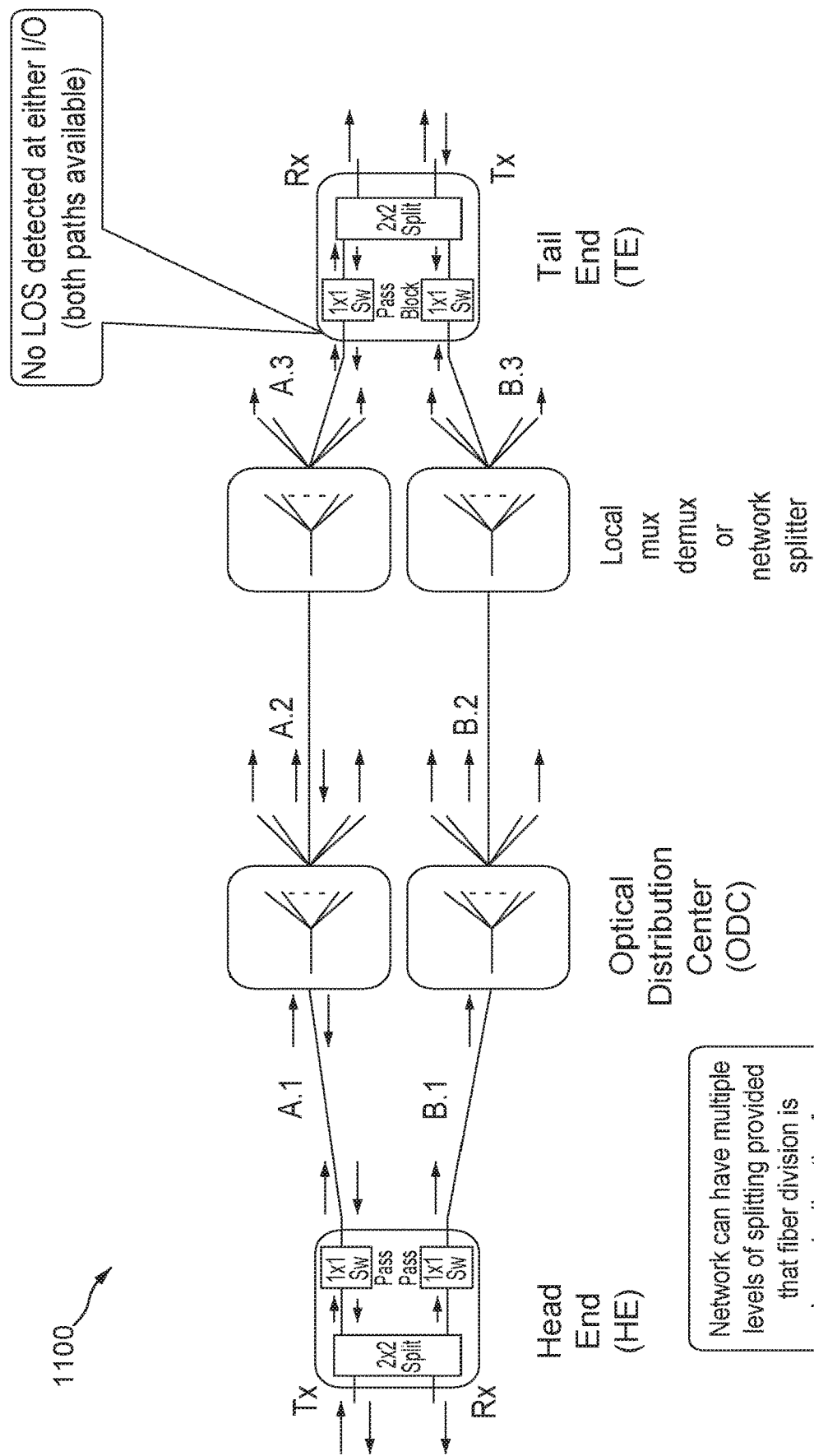
FIG. 11 is a functional block diagram depicting a third example switch system in a network, in accordance with an embodiment.

FIG. 11 is a functional block diagram depicting a third example switch system 1100 in a network (not shown), in accordance with an embodiment. The switch system 1100 can be functionally and/or structurally similar to any switch system described herein (e.g., switch system 200). The network can include, for example, a redundant multiple star network. The network can have multiple levels of beam splitting (e.g., provided that splitting is configured to be in one direction such as from HE to TE). The network can have fully independent fiber paths. As shown, under normal operation, path A.1:A.2:A.3 can be used for bidirectional (signal) transmission.

As shown in FIG. 11, the switch system 1100 includes a head-end optical switch (e.g., OPS 210) at a head end (HE), interconnected to a tail-end optical switch at a tail end (TE) over an optical distribution center (ODC), with a local multiplexer (labeled "mux") and demultiplexer (labeled "demux"), or a network splitter, between the ODC and the TE. Path B.1:B.2:B.3 carries the eastbound HE test signal (TE reserves path on operational standby). An OPS (e.g., 210) at TE can be used to select or define a path (e.g., via A.3:A2:A1) by which to send the westbound or return signal to HE to an OPS (e.g., 210) at HE.

Figure 12:
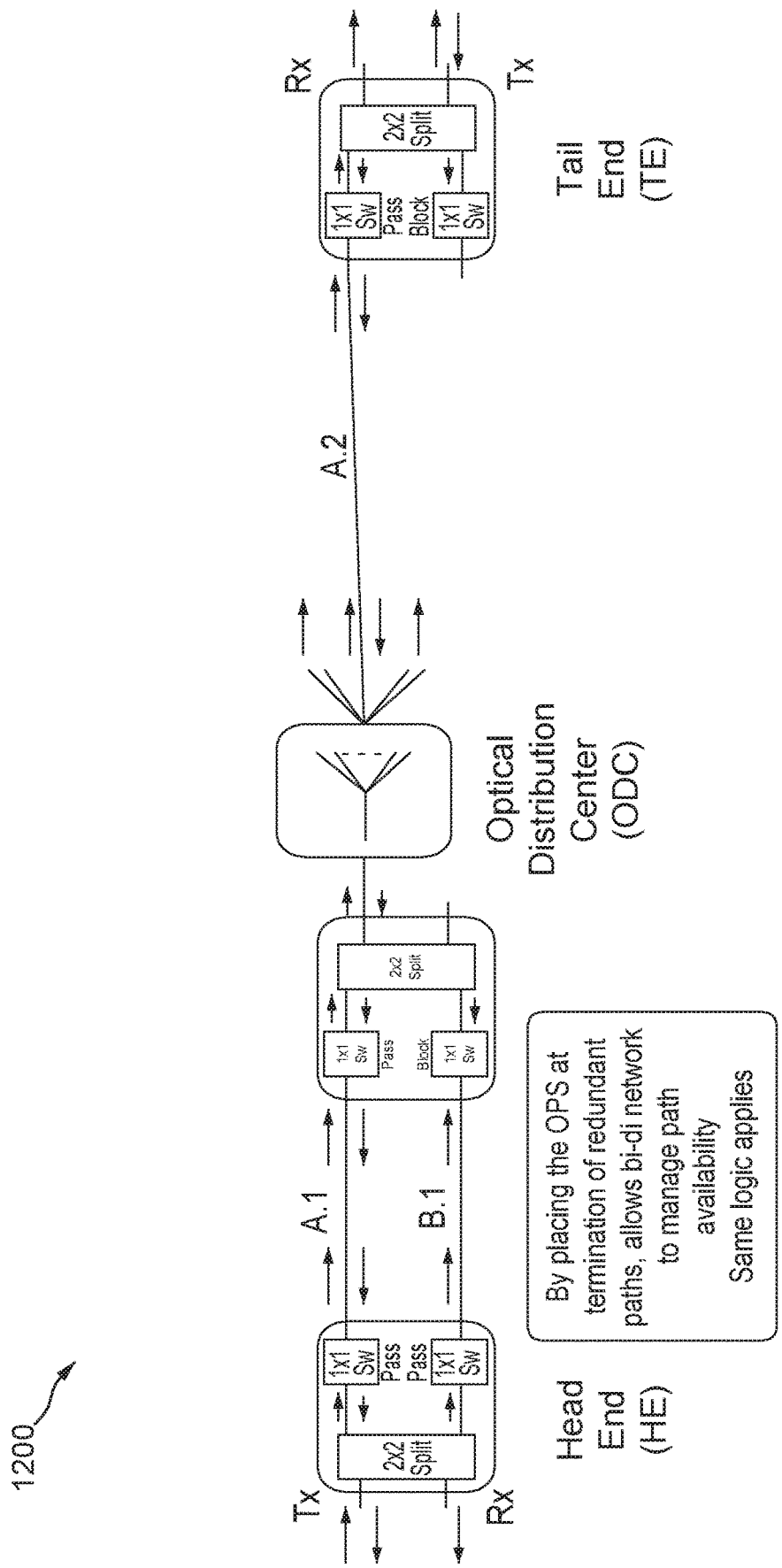
FIG. 12 is a functional block diagram depicting a fourth example switch system in a network, in accordance with an embodiment.

FIG. 12 is a functional block diagram depicting a fourth example switch system 1200 in a network (not shown), in accordance with an embodiment. The switch system 1200 can be functionally and/or structurally similar to any switch system described herein (e.g., switch system 200). The network can include, for example, a partially redundant star network. The network can have multiple levels of splitting provided that fiber division is always in direction from HE to TE. The network can have independent fiber paths. For example, the network can include independent fiber paths at the head-end optical switch HE (leading to) ODC, thereby exposing the ODC and the TE to shared risk of a path failure event.

As shown, under normal operation (e.g., of network), Path A.1:A.2 can be used for bi-directional (signal) transmission. Path B.1 carries the eastbound HE test signal (where the path B.1 is used as an operational standby path). The switch at OPS selected to send the westbound or return signal via A1 to HE. As shown, by placing the OPS at a termination point of redundant paths, the bidirectional network is enabled so as to manage path availability. The switch system 1200 can be configured to provide path protection, as described herein.

Figure 13:
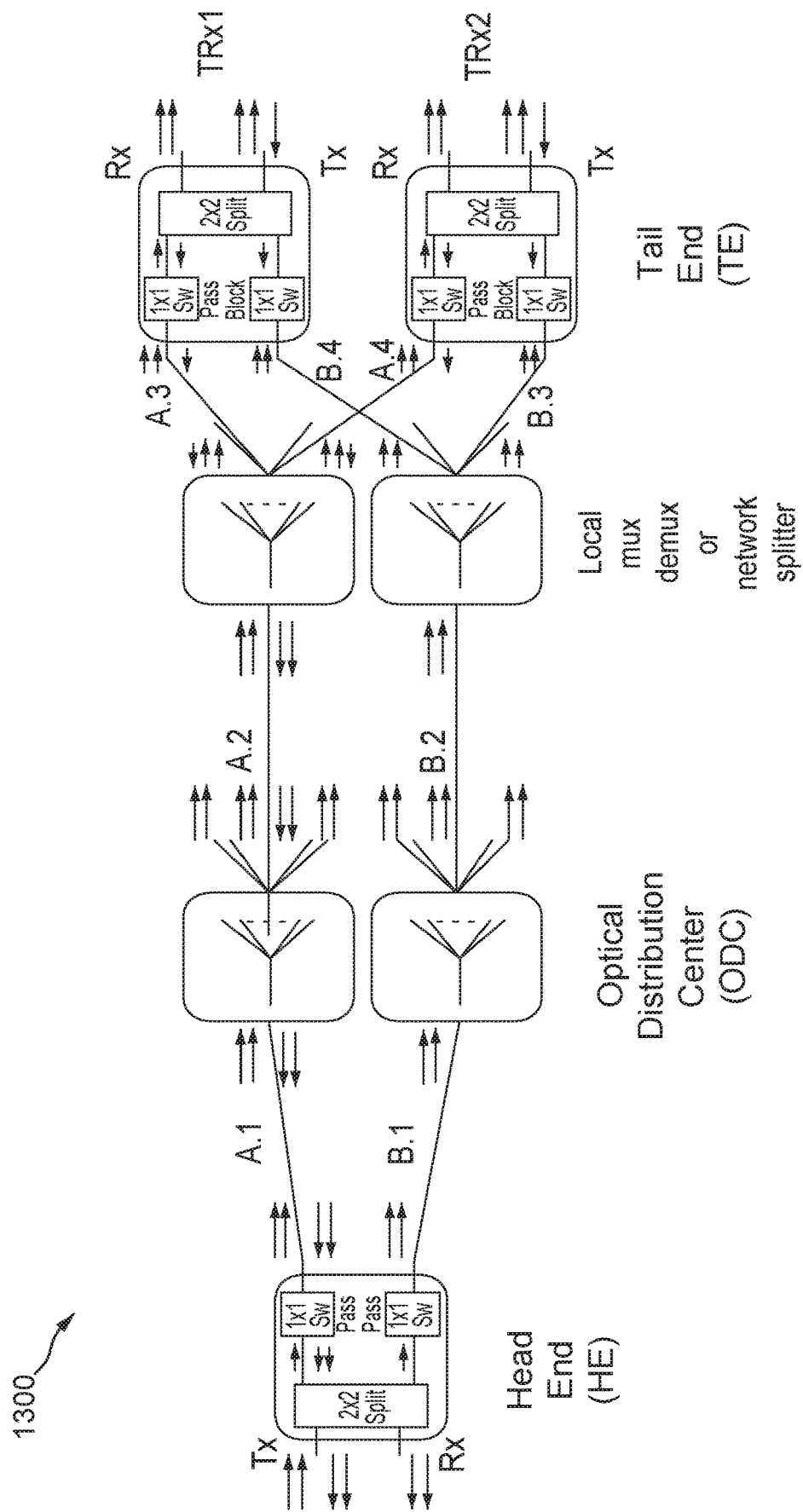
FIGS. 13-15 are functional block diagrams depicting a fifth example switch system configured to operate in various modes in a network, in accordance with an embodiment.
Figure 14:
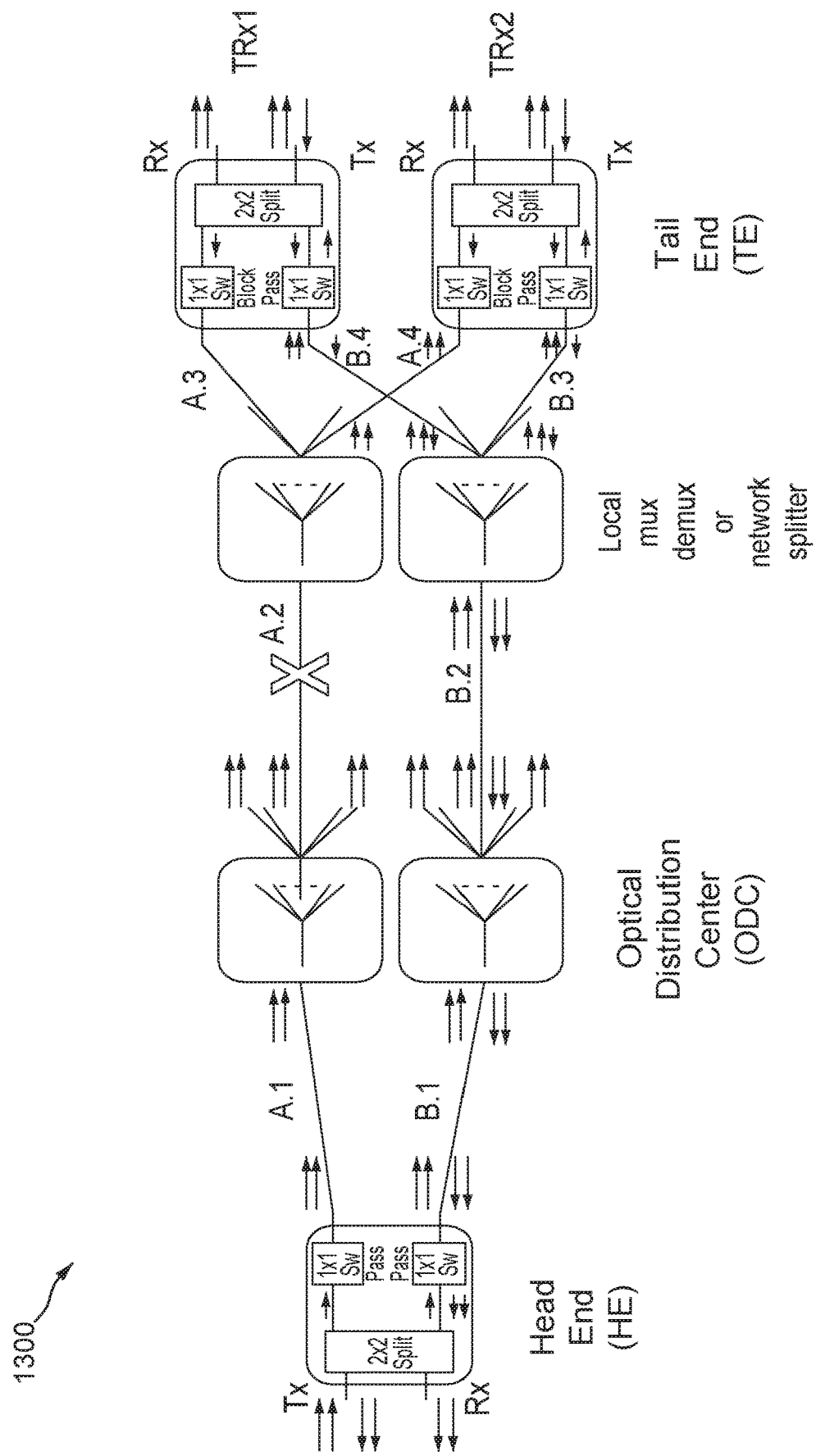
Figure 15:
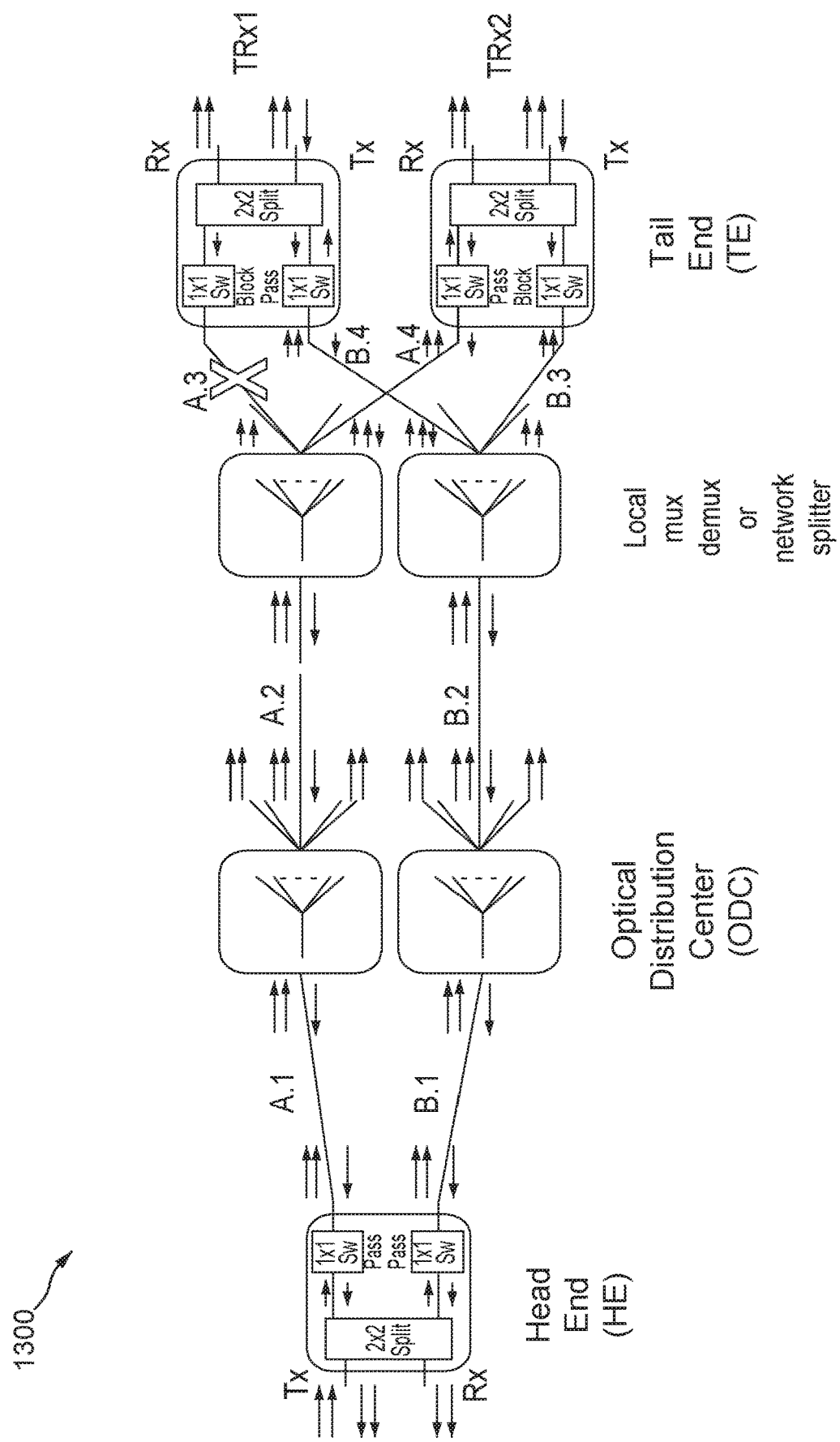

FIGS. 13-15 are functional block diagrams depicting a fifth example switch system 1300, configured to operate in various modes in a network (not shown), in accordance with an embodiment. The switch system 1300 can be functionally and/or structurally similar to any switch system described herein (e.g., switch system 200). The network (e.g., in which the fifth example switch system 1300 can be configured to operate) can include, for example, a redundant multiple star network (e.g., WDM PON).

The switch system 1300 can be configured to provide, for example, diverse path protection over fully independent optical paths A and B (e.g., similar to path 205, path 207). For example, as shown, the diverse path protection can be provided over paths A.1:A.2:A.3, A.1:A.2:A.4, B.1:B.2:B.3, and B.1:B.2:B.4.

With reference to FIG. 13, under normal operation (e.g., of network), transmitter TRx1 (not shown) sends signals via path A.1:A.2:A.3, which can be used for bi-directional (signal) transmission. Moreover, transmitter TRx2 (not shown) sends signals via path A.1:A.2:A.4, which can be used for bi-directional transmission. An alternative path, e.g., B.1:B.2:B.3, carries eastbound HE test signals. The switch system 1300 can be configured to provide path protection, as described herein.

With reference to FIG. 14, a path failure event (e.g., in/of network) occurs on path A.1 (or A.2). The path failure event is detected based on LOS at TE (e.g., routed between HE, and transmitter TRx1 and/or transmitter TRx2). The detected LOS causes the TE device (e.g., similar to OPS 210A) to invert switch state at both transmitter TRx1 and transmitter TRx2. Accordingly, the switch at TE is selected to send westbound or return signal via path B.2:B.1 to HE (e.g., similar to OPS 210B). Path A.1 carries the eastbound HE test signal (which does not reach TE due to fault); therefore, LOS is detected via an OPS (e.g., OPS 210) at TE and the OPS provides the single-ended diverse path switching, as described herein.

With reference to FIG. 15, a path failure event (e.g., in/of network) occurs on path A.3. The path failure event is detected based on LOS at TE (e.g., routed between HE, and transmitter TRx1 and/or transmitter TRx2). The detected LOS causes the TE device (e.g., similar to OPS 210A) to invert switch state at transmitter TRx1 while transmitter TRx2 is unaffected. Accordingly, the switch at TE is selected to send westbound or return signal via path B.2:B.1 to HE (e.g., similar to OPS 210B). Path A.1 carries the eastbound HE test signal (which does not reach TRx1 due to fault); therefore, LOS is detected via an OPS (e.g., OPS 210) at TE and the OPS provides the single-ended diverse path switching, as described herein.

Figure 16:
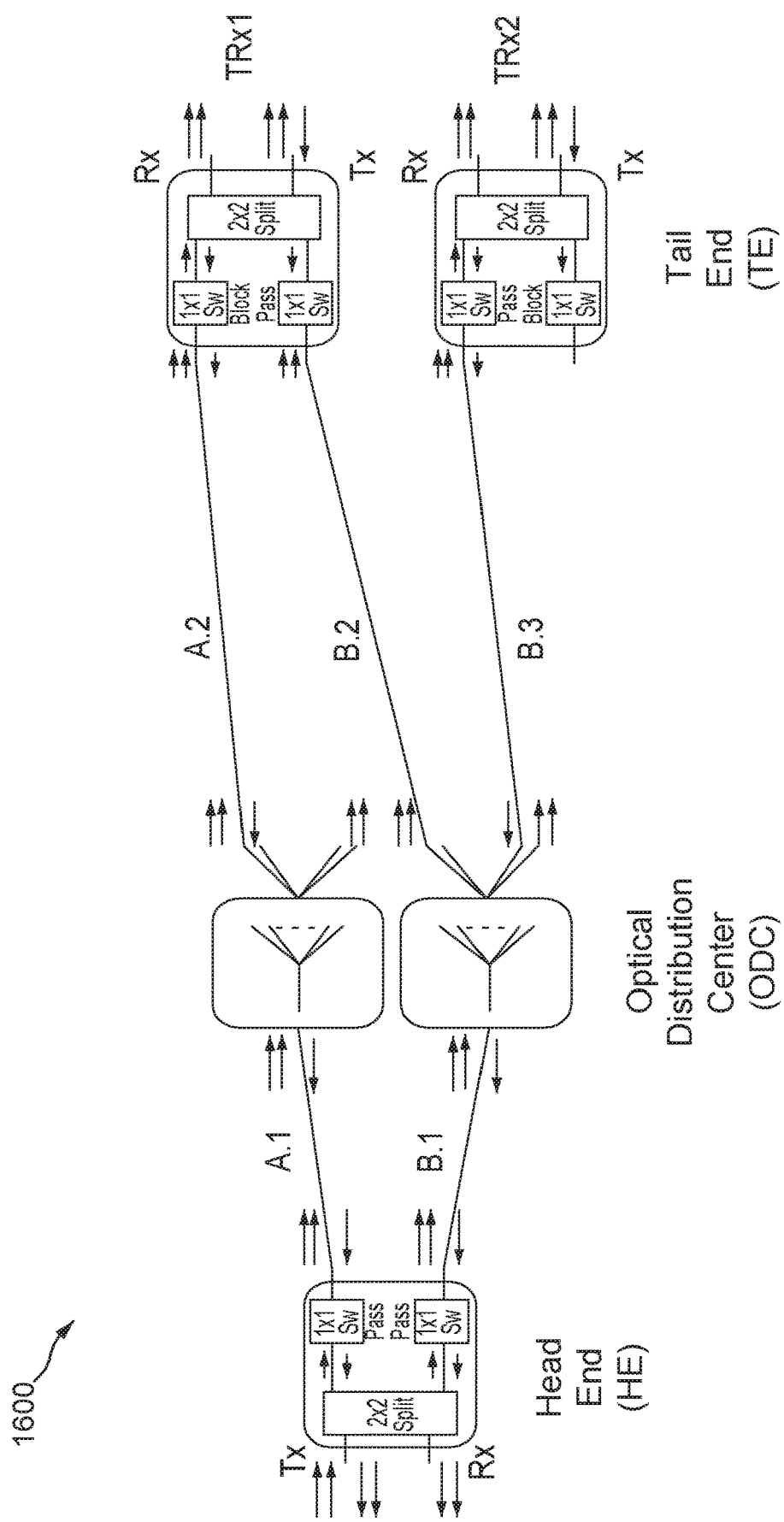
FIGS. 16-18 are functional block diagrams depicting a sixth example switch system configured to operate in various modes in a network, in accordance with an embodiment.
Figure 17:
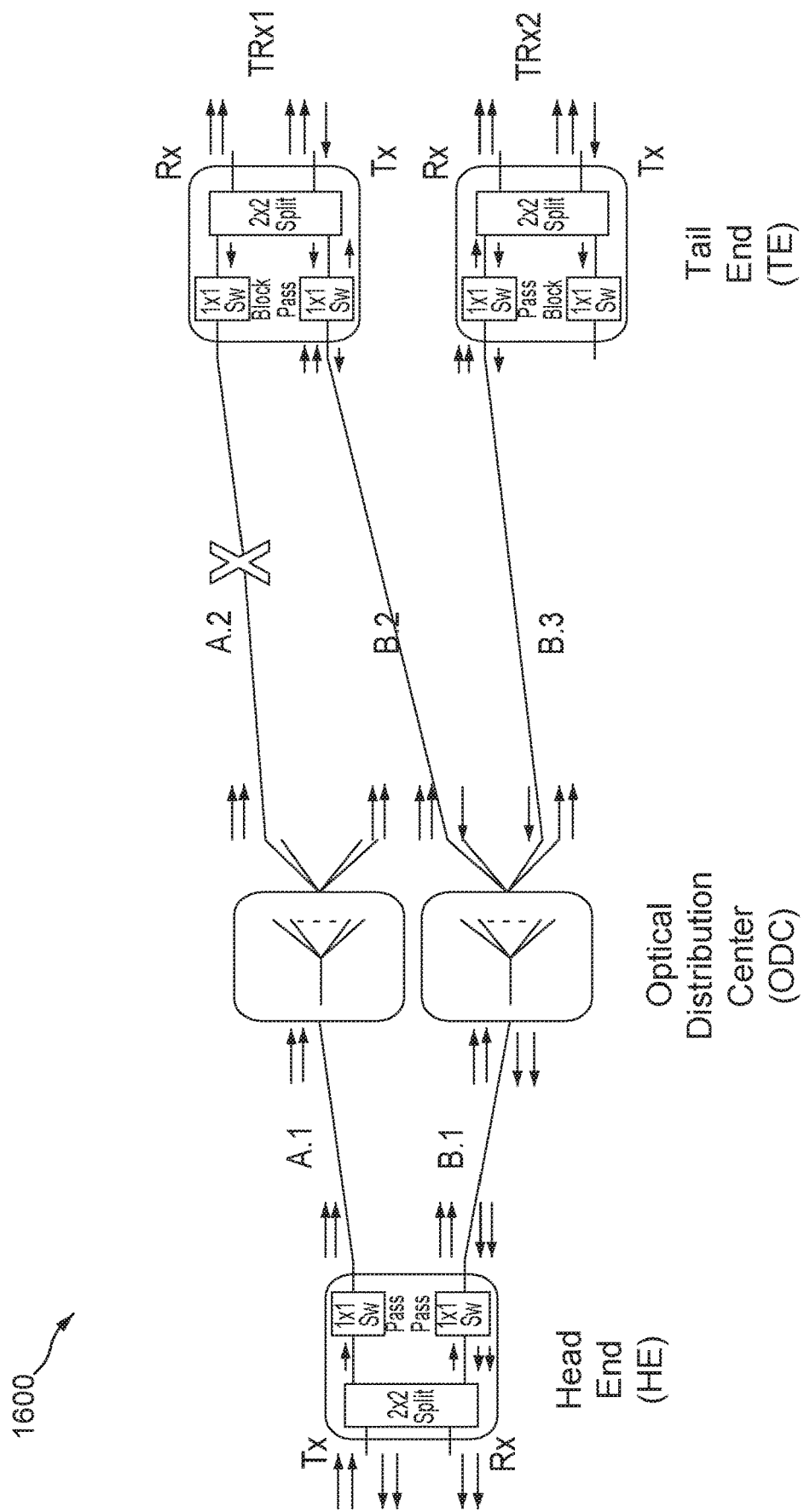
Figure 18:
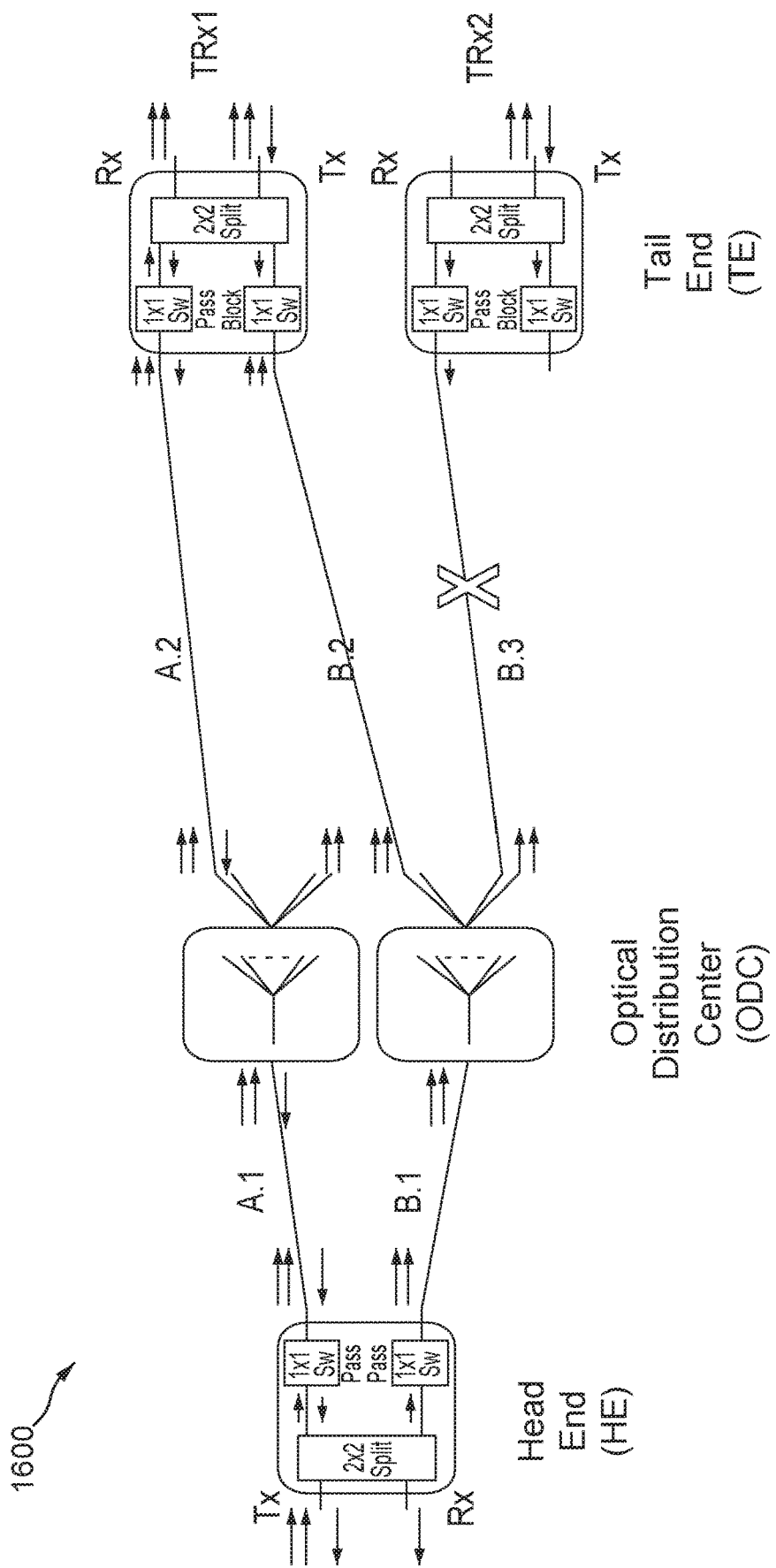

FIGS. 16-18 are functional block diagrams depicting a sixth example switch system 1600, configured to operate in various modes in a network (not shown), in accordance with an embodiment. The switch system 1600 can be functionally and/or structurally similar to any switch system described herein (e.g., switch system 200). The network can include, for example, a hybrid redundant network (e.g., WDM PON). The switch system 1600 can be configured to provide, for example, diverse path protection over fully independent optical paths A and B (e.g., similar to path 205, path 207). For example, as shown, the diverse path protection can be provided over paths A.1, A.2, B.1, B.2, and B.3. In some instances, the network may include, for example, fully independent fiber paths from HE to transmitter TRx1, and a single path to transmitter TRx2 (e.g., only one fiber available to transmitter TRx2 site).

With reference to FIG. 16, under normal operation (e.g., of network), transmitter TRx1 Path A.1:A.2 is used for bi-directional transmission. Transmitter TRx2 Path B.1:B.3 is used for bi-directional transmission.

With reference to FIG. 17, a path failure event (e.g., in/of network) occurs on path A.2 (or A.1). The path failure event is detected based on LOS at TE I/O at transmitter TRx1. The detected LOS causes the TE device (e.g., similar to OPS 210A) to invert switch state on transmitter TRx1, such as described herein. This enables the transmitter TRx1 path to be fully protected.

With reference to FIG. 18, a path failure event (e.g., in/of network) occurs on path B.3. The path failure event is detected based on LOS at TE I/O at transmitter TRx2. In some instances, such as those in which transmitter TRx2 is using only single fiber input (unprotected) and so cannot respond to automatically recover the failure, the transmitter TRx1 path is fully independent and not disturbed.

Detailed embodiments of the present disclosure have been disclosed herein or purposes of describing and illustrating claimed structures and methods that can be embodied in various forms, and are not intended to be exhaustive in any way, or limited to the disclosed embodiments. Many modifications and variations will be apparent without departing from the scope of the disclosed embodiments. The terminology used herein was chosen to best explain the principles of the one or more embodiments, practical applications, or technical improvements over current technologies, or to enable understanding of the embodiments disclosed herein. As described, details of well-known features and techniques can be omitted to avoid unnecessarily obscuring the embodiments of the present disclosure.

References in the specification to "one embodiment," "an embodiment," "an example embodiment," or the like, indicate that the embodiment described can include one or more particular features, structures, or characteristics, but it shall be understood that such particular features, structures, or characteristics may or may not be common to each and every disclosed embodiment of the present disclosure herein. Moreover, such phrases do not necessarily refer to any one particular embodiment per se. As such, when one or more particular features, structures, or characteristics is described in connection with an embodiment, it is submitted that it is within the knowledge of those skilled in the art to affect such one or more features, structures, or characteristics in connection with other embodiments, where applicable, whether or not explicitly described.

While some implementations have been described and illustrated herein, a variety of other means and/or structures for performing the function and/or obtaining the results and/or one or more of the advantages is possible. More generally, parameters, dimensions, materials, and configurations described herein are meant to be exemplary and that the actual parameters, dimensions, materials, and/or configurations will depend upon the specific application or applications for which the inventive teachings is/are used. It is, therefore, to be understood that the foregoing embodiments are presented by way of example only and that, within the scope of the appended claims and equivalents thereto; and that embodiments can be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

Also, various concepts can be embodied as one or more methods, of which an example has been provided. The acts performed as part of the method can be ordered in any suitable way. Accordingly, embodiments can be constructed in which acts are performed in an order different than illustrated, which can include performing some acts simultaneously, even though shown as sequential acts in illustrative embodiments.

What is claimed is:

1. A system, comprising:
   a first optical protection switch (OPS) disposed at a tail-end node and configured to couple, over a first optical path and a second optical path, via coupling to a network having at least one node, and to a second OPS disposed at a head-end node in the network,
   each of the first OPS and the second OPS including:
   a first port configured to receive a first signal;
   a second port configured to receive a second signal;
   an optical coupler in optical communication with the first port and the second port and configured to split the first signal into a first signal instance and a second signal instance and forward the second signal;
a first switch and a second switch, each in optical communication with the optical coupler and switchable between a first state and a second state
a third port, in optical communication with the first switch and configured to provide one of bidirectional communication or unidirectional communication; and
a fourth port in optical communication with the optical coupler and configured to provide one of the other of bidirectional communication or unidirectional communication,
the first OPS and the second OPS configured to provide a 1+1 protection over the first optical path and the second optical path
both the first OPS and the second OPS are configured to:
receive, over at least one of the first optical path or the second optical path, network traffic in the network;
detect, based on the network traffic, an optical path failure event on at least one of the first optical path or the second optical path;
actuate, in response to detecting the optical path failure event, the second switch to
(i) set the second switch to one of the first state or the second state, and
(ii) route at least a portion of the network traffic over at least one of the first optical path or the second optical path; and
actuate, in response to detecting the optical path failure event, the first switch to
(i) set the first switch to one of the first state or the second state, the first switch being set to the first state when the second switch is set to the second state, the first switch being set to the second state when the second switch is set to the first state, and
(ii) block at least a portion of the network traffic over at least one of the first optical path or the second optical path.

2. The system of claim 1, wherein:
the first OPS is a tail-end optical switch,
the second OPS is a head-end optical switch, and
the network includes a passive optical network.

3. The system of claim 1, wherein the network includes a bidirectional network.

4. The system of claim 1, wherein the network is a wavelength division multiplexing passive optical network.

5. The system of claim 1,
the fourth port, in optical communication with the optical coupler, is configured to pass, on the first optical path, the first signal instance.

6. The system of claim 1, wherein:
the first OPS is configured to couple, over the first optical path and the second optical path, to the network via coupling to a splitter that is in the network and that is configured as an optical switch head-end.

7. The system of claim 1, wherein:
the node includes a distribution node; and
at least one of a multiplexer, a demultiplexer, and a splitter is disposed between the node and the tail-end node.

8. An apparatus, comprising:
a tail-end optical switch configured to be coupled to a broadcast star network that couples the tail-end optical switch to a head-end optical switch, over a node, by a primary bidirectional optical path and a second bidirectional optical path,
the tail-end optical switch having a first optical switch and a second optical switch configured to provide active switching,
the tail-end optical switch configured to provide a 1+1 protection over the primary bidirectional optical path, the second bidirectional optical path, and across the node, by using the active switching without active switching at the head-end optical switch, such that (i) a first port of the tail-end optical switch is configured to provide one of bidirectional communication or unidirectional communication, and (ii) a second port of the tail-end optical switch is configured to provide the other of bidirectional communication or unidirectional communication, the head-end optical switch having a first optical switch and second optical switch, each of the tail-end optical switch and head-end optical switch having optical coupler being coupled to the first optical switch and the second optical switch of respective optical coupler, each of the tail-end optical switch and head-end optical switch having four ports for bidirectional or unidirectional communications, both the tail-end optical switch and the head-end optical switch are configured to:
receive, over at least one of the primary bidirectional optical path or the second bidirectional optical path, network traffic in the broadcast star network;
detect, based on the network traffic, an optical path failure event on at least one of the primary bidirectional optical path or the second bidirectional optical path;
actuate, in response to detecting the optical path failure event, the second switch to
(i) set the second switch to one of a first state or a second state, and
(ii) route at least a portion of the network traffic over at least one of the primary bidirectional optical path or the second bidirectional optical path; and
actuate, in response to detecting the optical path failure event, the first switch to
(i) set the first switch to one of the first state or the second state, the first switch being set to the first state when the second switch is set to the second state, the first switch being set to the second state when the second switch is set to the first state, and
(ii) block at least a portion of the network traffic over at least one of the primary bidirectional optical path or the second bidirectional optical path.

9. The apparatus of claim 8, wherein the tail-end optical switch is an optical protection switch (OPS) configured to receive a first signal and transmit a second signal on at least one of the primary bidirectional optical path or the second bidirectional optical path.

10. The apparatus of claim 8, wherein the head-end optical switch is a first switch and the tail-end optical switch is an optical protection switch (OPS) that includes:
an optical coupler configured to
(i) split, without wavelength filtering, traffic in the broadcast star network on at least one of the primary bidirectional optical path or the second bidirectional optical path, and
(ii) combine, without wavelength filtering, traffic in the broadcast star network from the primary bidirectional optical path and the second bidirectional optical path;

the first switch, in optical communication with the optical coupler and switchable between a first state and a second state, the first switch configured to pass network traffic while the first switch is in the first state, and block network traffic while the first switch is in the second state; and a second switch, in optical communication with the optical coupler and switchable between the first state and the second state, the second switch configured to be switched to the first state when the first switch is in the second state, and to the second state when the first switch is in the first state, the second switch configured to pass network traffic when the second switch is in the first state, and to block network traffic when the second switch is in the second state.

11. The apparatus of claim 10, wherein the optical coupler is a bidirectional Multiplexer/Demultiplexer (MD) coupler.

12. The apparatus of claim 10, wherein the head-end optical switch is an optical protection switch (OPS), and a type of the tail-end optical switch corresponds to the type of the head-end optical switch.

13. The apparatus of claim 10, wherein the head-end optical switch includes an optical protection switch (OPS) that includes:

an optical coupler configured to pass network traffic.

14. The apparatus of claim 8, wherein the tail-end optical switch is configured to:

detect, based on traffic in the broadcast star network, an optical path failure event on the primary bidirectional optical path or the second bidirectional optical path; and actuate, in response to detecting the optical path failure event and to provide the active switching, (i) the first optical switch to set the first optical switch to one of the first state or the second state, and (ii) the second optical switch to set the second optical switch to the other one of the first state or the second state opposite that of the first optical switch.

15. A system, comprising:

a first optical protection switch (OPS) including:

a first port, a first optical coupler in optical communication with the first port, a first switch in optical communication with the first optical coupler, a second port in optical communication with the first switch and a first optical path and configured to provide one of bidirectional communication or unidirectional communication, and a third port in optical communication with a second switch and a second optical path and configured to provide one of the other of bidirectional communication or unidirectional communication, the first optical coupler configured to split a first signal into a first signal instance and a second signal instance; and a second OPS including:

a fourth port, a second optical coupler in optical communication with the fourth port, a fifth port in optical communication with the second optical coupler and the first optical path and configured to provide one of bidirectional communication or unidirectional communication, and a sixth port in optical communication with the second optical coupler and the second optical path and configured to provide one of the other of bidirectional communication or unidirectional communication; a third optical switch and a fourth optical switch; a second optical coupler operatively coupled to the third optical switch and the fourth optical switch;

the first OPS, when coupled over a node to the second OPS via the first optical path and the second optical path, configured to: provide active switching between the first optical path and the second optical path; and provide, using the active switching and without active switching at the second OPS, a 1+1 protection over the first optical path and the second optical path and across the node, both the first OPS and the second OPS are configured to:

receive, over at least one of the first optical path or the second optical path, network traffic in a network, detect, based on the network traffic, an optical path failure event on at least one of the first optical path or the second optical path;

actuate, in response to detecting the optical path failure event, the second switch or fourth optical switch to (i) set the second switch or fourth optical switch to one of a first state or a second state, and (ii) route at least a portion of the network traffic over at least one of the first optical path or the second optical path; and actuate, in response to detecting the optical path failure event, the first switch or third optical switch to (i) set the first switch or third optical switch to one of the first state or the second state, the first switch or third optical switch being set to the first state when the second switch or fourth optical switch is set to the second state, the first switch or third optical switch being set to the second state when the second switch or fourth optical switch is set to the first state, and (ii) block at least a portion of the network traffic over at least one of the first optical path or the second optical path.

16. The system of claim 15, wherein the first OPS is configured to couple to the network when coupled, over the node, to the second OPS via the first optical path and the second optical path.

17. The system of claim 15, wherein the first optical coupler is a bidirectional Multiplexer/Demultiplexer (MD) coupler.

18. The system of claim 15, wherein:

the first OPS is a tail-end optical switch;

the second OPS is a head-end optical switch; and the first OPS is configured to couple to the network when coupled, over the node, to the second OPS.

* * * * *